US012665707B2

(12) United States Patent
Sarkis et al.

(10) Patent No.: US 12,665,707 B2
(45) Date of Patent: Jun. 23, 2026

(54) RESOURCE COLLISION INDICATION USING FEEDBACK

(71) Applicant: QUALCOMM Incorporated, San Diego, CA (US)

(72) Inventors: Gabi Sarkis, San Diego, CA (US); Tien Viet Nguyen, Bridgewater, NJ (US); Souriya Dutta, San Diego, CA (US); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 545 days.

(21) Appl. No.: 17/378,502

(22) Filed: Jul. 16, 2021

(65) Prior Publication Data

US 2022/0029756 A1 Jan. 27, 2022

Related U.S. Application Data

(60) Provisional application No. 63/056,486, filed on Jul. 24, 2020.

(51) Int. Cl.
| | |
|---|---|
| *H04L 1/1867* | (2023.01) |
| *H04W 72/0446* | (2023.01) |
| *H04W 72/0453* | (2023.01) |
| *H04W 72/1263* | (2023.01) |
| *H04W 72/20* | (2023.01) |
| *H04W 72/56* | (2023.01) |
| *H04W 92/18* | (2009.01) |

(52) U.S. Cl.
CPC ....... *H04L 1/1896* (2013.01); *H04W 72/0446* (2013.01); *H04W 72/0453* (2013.01); *H04W 72/1263* (2013.01); *H04W 72/20* (2023.01); *H04W 72/56* (2023.01); *H04W 92/18* (2013.01)

(58) Field of Classification Search
CPC ................. H04L 1/1896; H04L 1/1861; H04L 2001/0092; H04W 72/0446; H04W 72/0453; H04W 72/1263; H04W 72/20; H04W 72/56; H04W 92/18
See application file for complete search history.

(56) References Cited

U.S. PATENT DOCUMENTS

2020/0178290 A1* 6/2020 Lee ........................ H04W 72/20
2020/0351032 A1* 11/2020 Wu ........................ H04W 72/56
(Continued)

*Primary Examiner* — Yu-wen Chang
(74) *Attorney, Agent, or Firm* — Holland & Hart LLP

(57) ABSTRACT

Methods, systems, and devices for wireless communications are described. Some wireless communications system may support sidelink communications between one or more sidelink user equipment (UE). A sidelink UE may receive control signaling such as sidelink control information that indicates a set of resources available for reservation by the UE from a sidelink resource pool. Based on decoding the sidelink control information, the UE may determine that a resource overlap is to occur between scheduled transmissions in a sidelink resource. Upon identifying the resource overlap, the UE may transmit a message such as a negative acknowledgement message. By transmitting the message, the UE may prompt retransmission from one or more UEs involved in the resource overlap, which may reduce latency and increase reliability for sidelink data in the wireless communications system.

30 Claims, 16 Drawing Sheets

Receive sidelink control information from a second UE in a sidelink control channel, the sidelink control information indicating a set of sidelink resources reserved for transmission by the second UE — 905

Transmit a message indicative of a resource overlap on a sidelink feedback channel based on the resource overlap indicated in the sidelink control information, the resource overlap occurring between sidelink transmissions scheduled on a sidelink resource of the set of sidelink resources — 910

900

(56) References Cited

U.S. PATENT DOCUMENTS

| | | | | |
|---|---|---|---|---|
| 2021/0058905 | A1* | 2/2021 | Ganesan | H04L 5/14 |
| 2021/0144750 | A1* | 5/2021 | Cao | H04W 72/0453 |
| 2021/0219320 | A1* | 7/2021 | Belleschi | H04W 72/20 |
| 2021/0360605 | A1* | 11/2021 | Hassan | H04W 72/20 |
| 2022/0095280 | A1* | 3/2022 | Farag | H04W 72/23 |
| 2022/0201654 | A1* | 6/2022 | Lee | H04W 72/20 |
| 2022/0394678 | A1* | 12/2022 | Zhang | H04W 72/20 |
| 2022/0399963 | A1* | 12/2022 | Lee | H04W 28/26 |
| 2023/0164825 | A1* | 5/2023 | Deng | H04W 72/40 |
| | | | | 370/329 |
| 2023/0209576 | A1* | 6/2023 | Hwang | H04W 92/18 |
| | | | | 370/329 |
| 2023/0217454 | A1* | 7/2023 | Lee | H04L 1/1822 |
| | | | | 370/329 |
| 2023/0292342 | A1* | 9/2023 | Lee | H04W 72/566 |
| 2023/0362973 | A1* | 11/2023 | Huang | H04W 4/40 |
| 2023/0371089 | A1* | 11/2023 | Liu | H04L 1/0693 |
| 2025/0016801 | A1* | 1/2025 | Yu | H04L 1/1614 |
| 2026/0012940 | A1* | 1/2026 | Hahn | H04L 5/0044 |

* cited by examiner

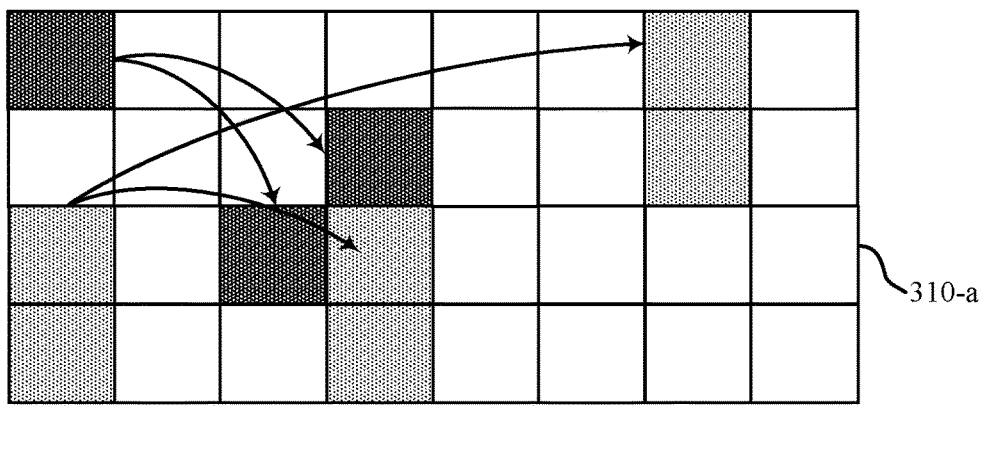
310-a
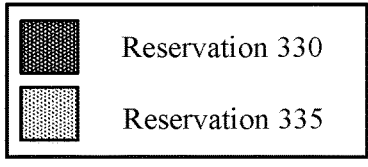
| Reservation 330 |
| Reservation 335 |
FIG. 3A
300-a
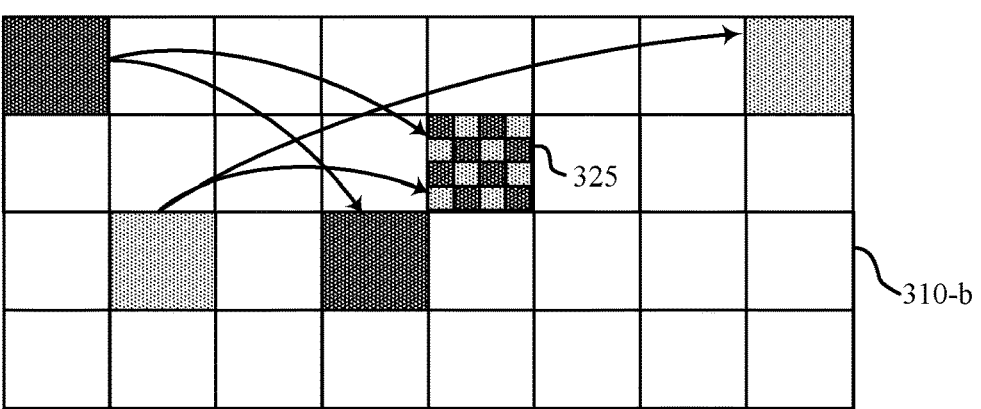
325
310-b
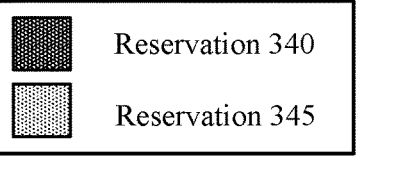
| Reservation 340 |
| Reservation 345 |
300-b
FIG. 3B 415-a 415-b

405

410 — Decode SCI

420 — Identify a time overlap between sidelink transmissions scheduled in a sidelink resource

425 — NACK

400

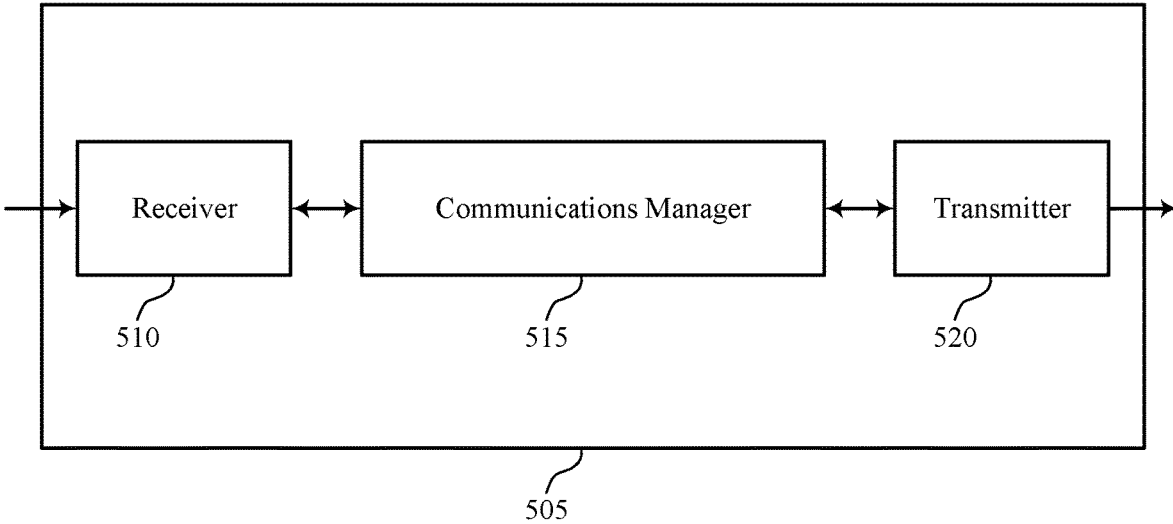
FIG. 5

Receive sidelink control information from a second UE in a sidelink control channel, the sidelink control information indicating a set of sidelink resources reserved for transmission by the second UE

905

Transmit a message indicative of a resource overlap on a sidelink feedback channel based on the resource overlap indicated in the sidelink control information, the resource overlap occurring between sidelink transmissions scheduled on a sidelink resource of the set of sidelink resources

910

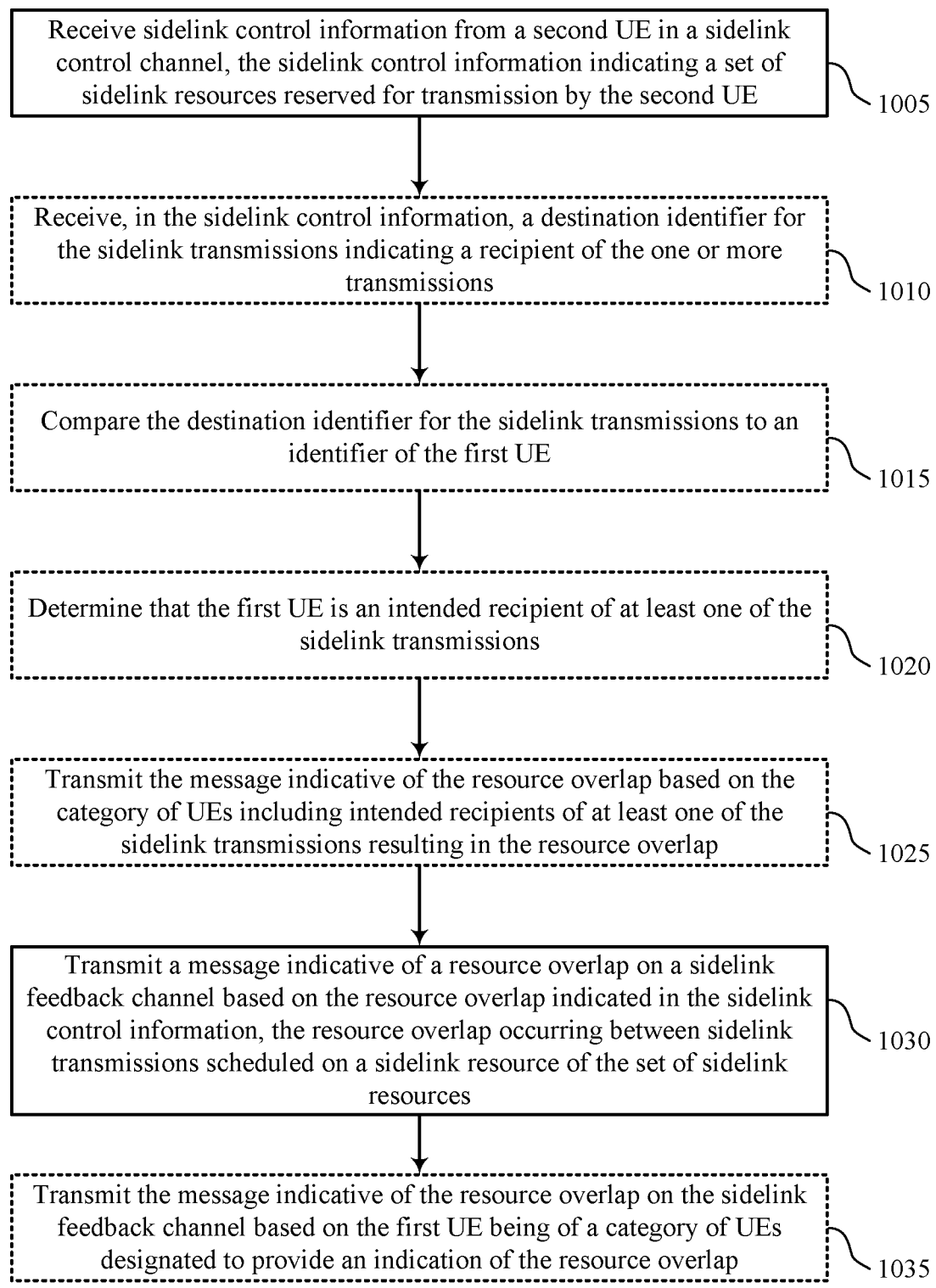

Receive sidelink control information from a second UE in a sidelink control channel, the sidelink control information indicating a set of sidelink resources reserved for transmission by the second UE

1005

Receive, in the sidelink control information, a destination identifier for the sidelink transmissions indicating a recipient of the one or more transmissions

1010

Compare the destination identifier for the sidelink transmissions to an identifier of the first UE

1015

Determine that the first UE is an intended recipient of at least one of the sidelink transmissions

1020

Transmit the message indicative of the resource overlap based on the category of UEs including intended recipients of at least one of the sidelink transmissions resulting in the resource overlap

1025

Transmit a message indicative of a resource overlap on a sidelink feedback channel based on the resource overlap indicated in the sidelink control information, the resource overlap occurring between sidelink transmissions scheduled on a sidelink resource of the set of sidelink resources

1030

Transmit the message indicative of the resource overlap on the sidelink feedback channel based on the first UE being of a category of UEs designated to provide an indication of the resource overlap

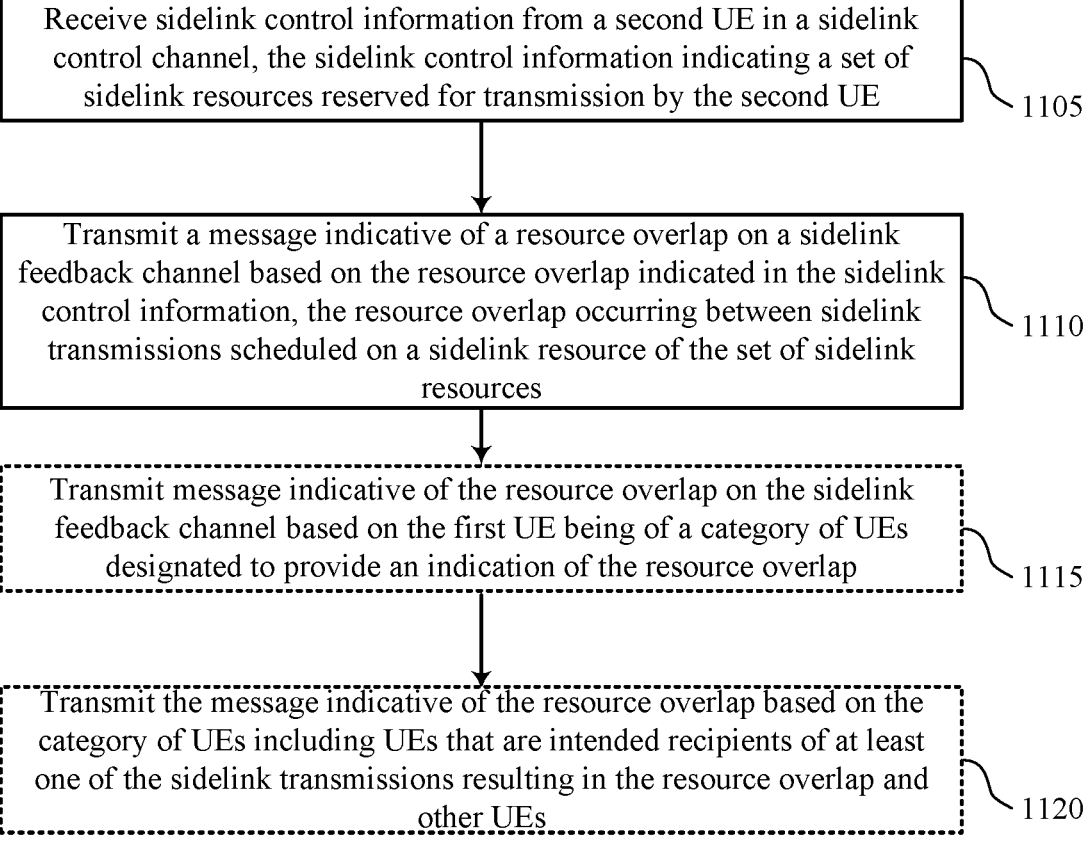

Receive sidelink control information from a second UE in a sidelink control channel, the sidelink control information indicating a set of sidelink resources reserved for transmission by the second UE

1105

Transmit a message indicative of a resource overlap on a sidelink feedback channel based on the resource overlap indicated in the sidelink control information, the resource overlap occurring between sidelink transmissions scheduled on a sidelink resource of the set of sidelink resources

1110

Transmit message indicative of the resource overlap on the sidelink feedback channel based on the first UE being of a category of UEs designated to provide an indication of the resource overlap

1115

Transmit the message indicative of the resource overlap based on the category of UEs including UEs that are intended recipients of at least one of the sidelink transmissions resulting in the resource overlap and other UEs

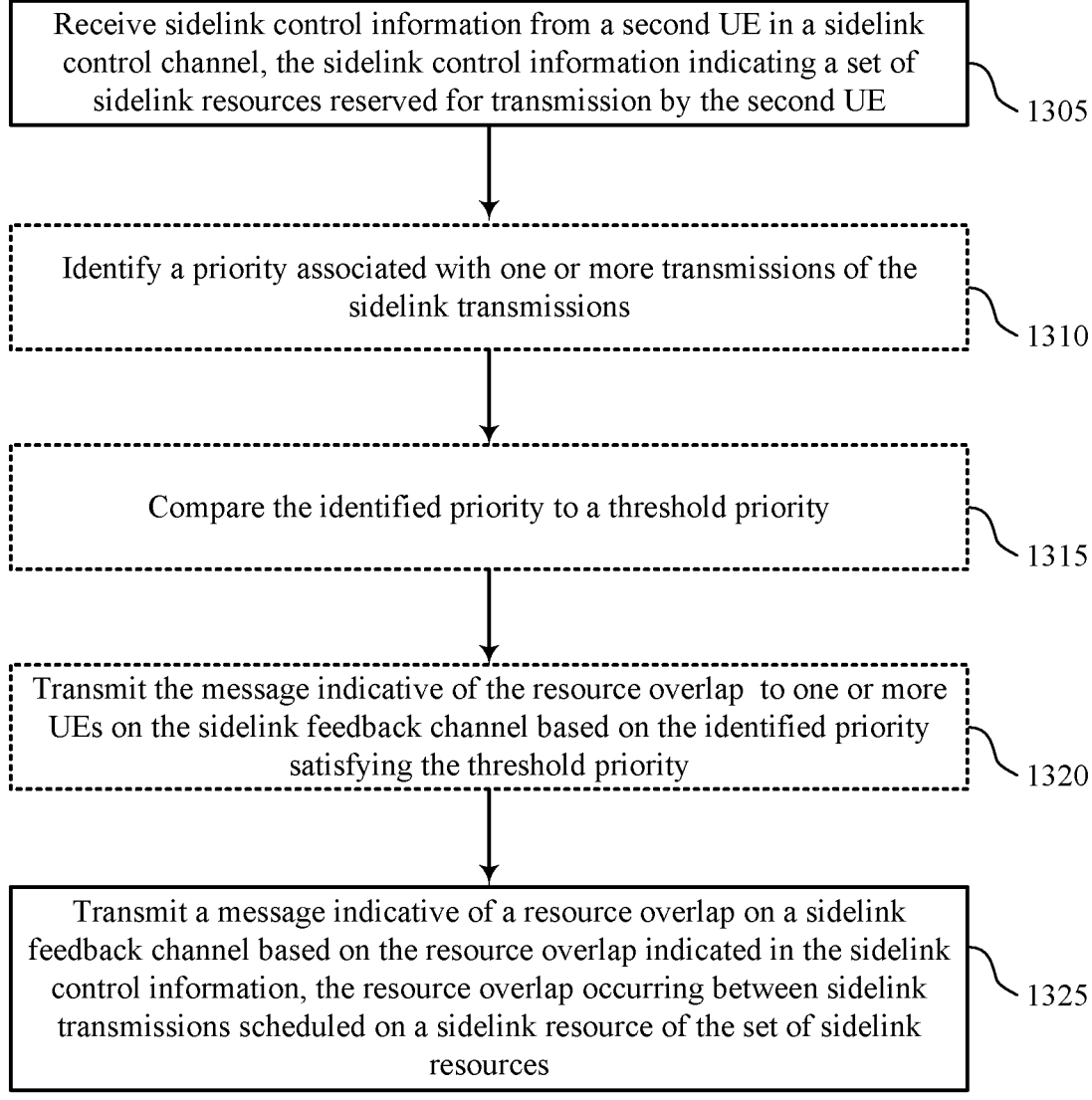

Receive sidelink control information from a second UE in a sidelink control channel, the sidelink control information indicating a set of sidelink resources reserved for transmission by the second UE

1305

Identify a priority associated with one or more transmissions of the sidelink transmissions

1310

Compare the identified priority to a threshold priority

1315

Transmit the message indicative of the resource overlap to one or more UEs on the sidelink feedback channel based on the identified priority satisfying the threshold priority

1320

Transmit a message indicative of a resource overlap on a sidelink feedback channel based on the resource overlap indicated in the sidelink control information, the resource overlap occurring between sidelink transmissions scheduled on a sidelink resource of the set of sidelink resources

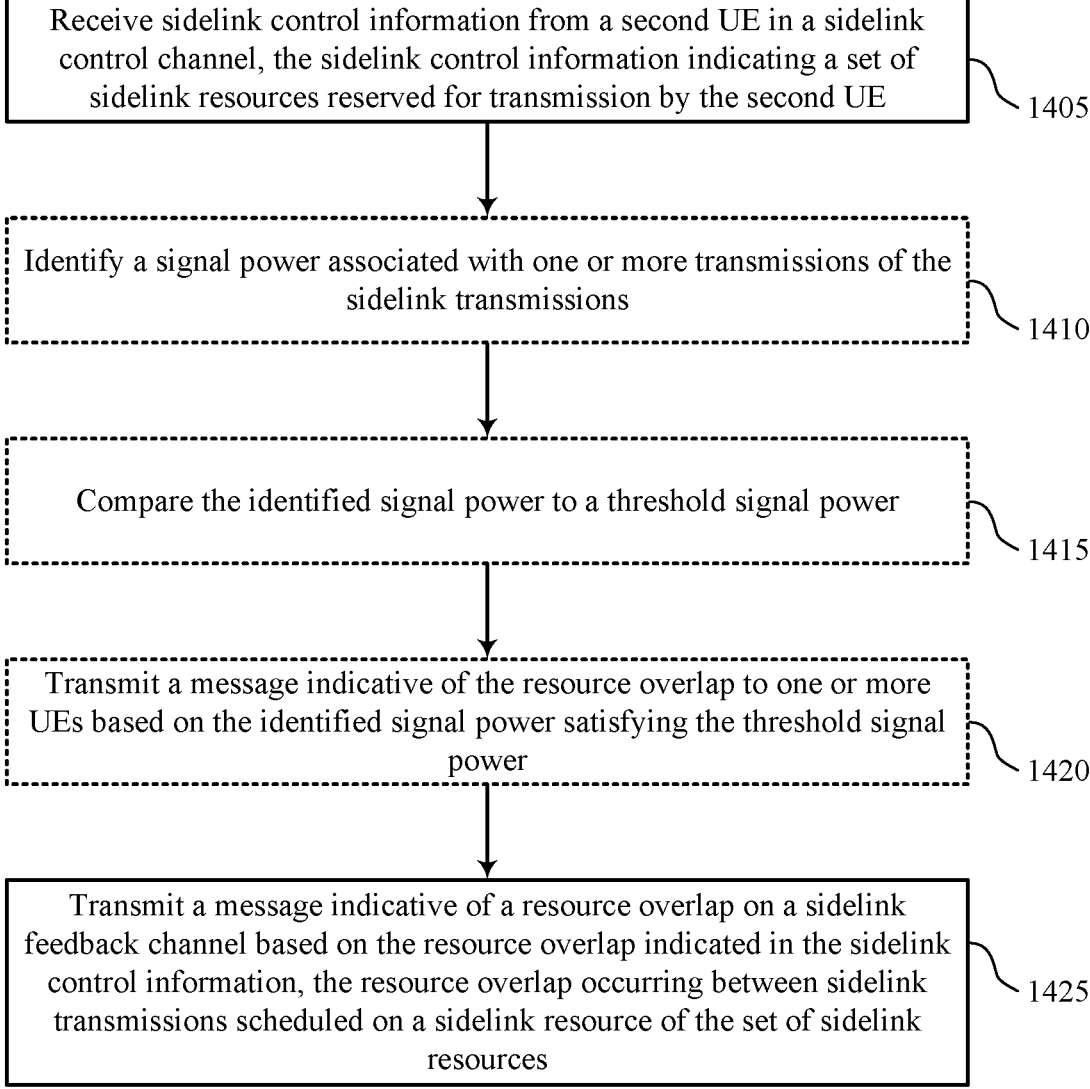

Receive sidelink control information from a second UE in a sidelink control channel, the sidelink control information indicating a set of sidelink resources reserved for transmission by the second UE

1405

Identify a signal power associated with one or more transmissions of the sidelink transmissions

1410

Compare the identified signal power to a threshold signal power

1415

Transmit a message indicative of the resource overlap to one or more UEs based on the identified signal power satisfying the threshold signal power

1420

Transmit a message indicative of a resource overlap on a sidelink feedback channel based on the resource overlap indicated in the sidelink control information, the resource overlap occurring between sidelink transmissions scheduled on a sidelink resource of the set of sidelink resources

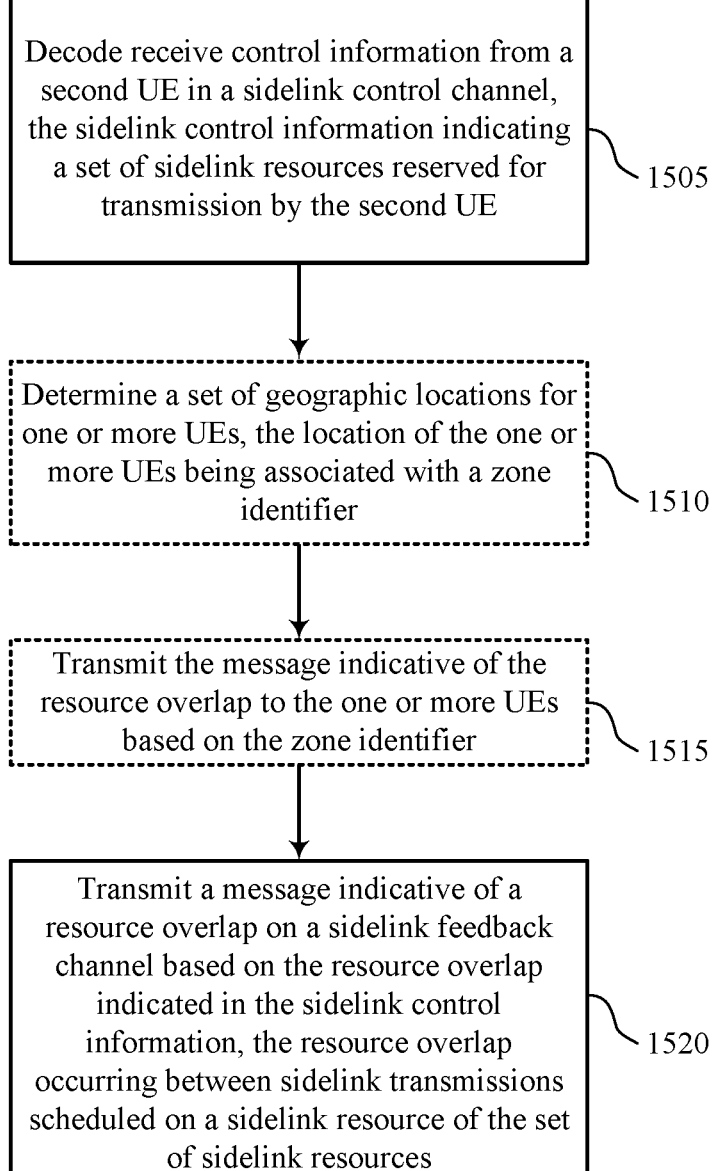

Decode receive control information from a second UE in a sidelink control channel, the sidelink control information indicating a set of sidelink resources reserved for transmission by the second UE

1505

Determine a set of geographic locations for one or more UEs, the location of the one or more UEs being associated with a zone identifier

1510

Transmit the message indicative of the resource overlap to the one or more UEs based on the zone identifier

1515

Transmit a message indicative of a resource overlap on a sidelink feedback channel based on the resource overlap indicated in the sidelink control information, the resource overlap occurring between sidelink transmissions scheduled on a sidelink resource of the set of sidelink resources

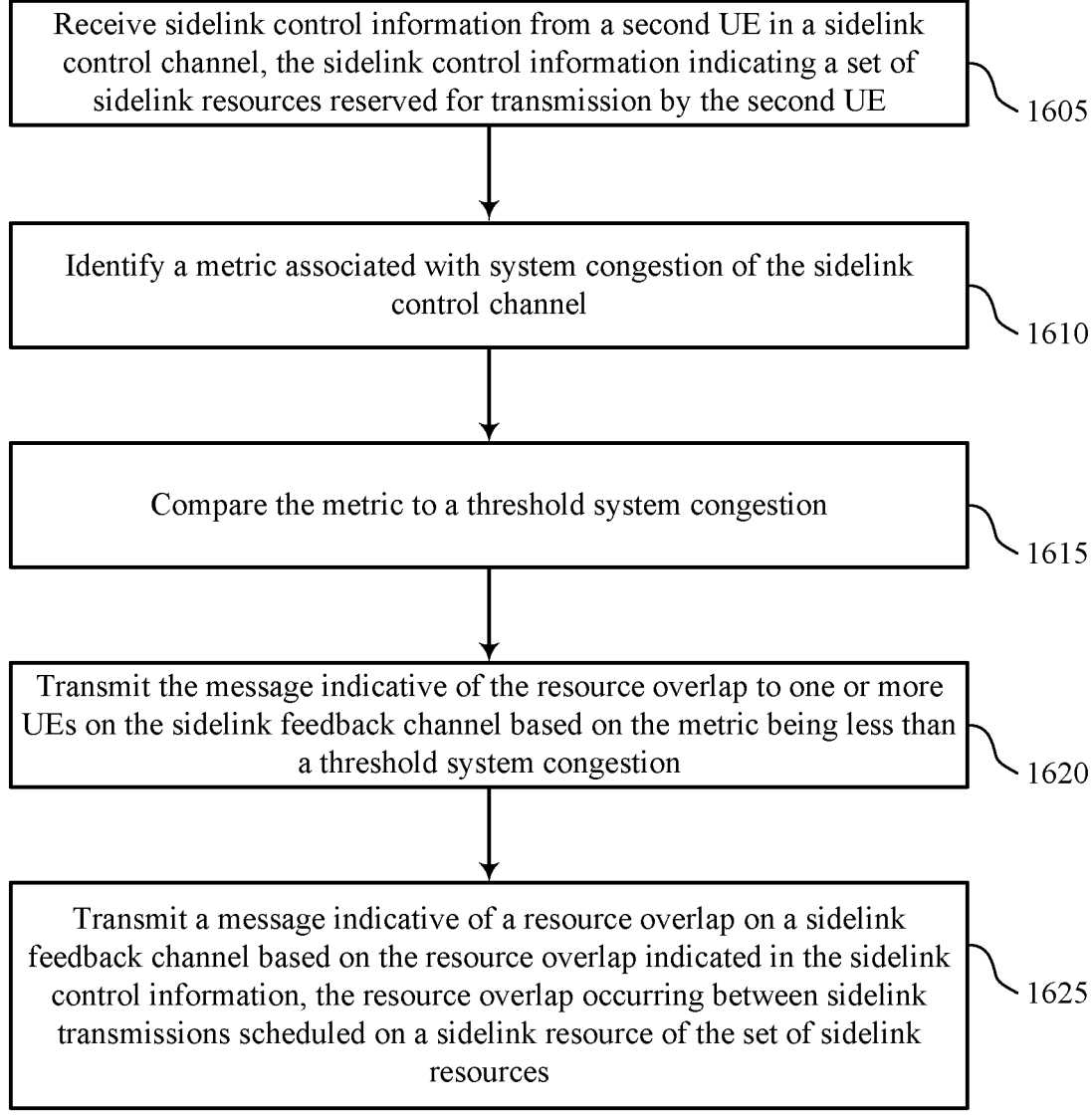

Receive sidelink control information from a second UE in a sidelink control channel, the sidelink control information indicating a set of sidelink resources reserved for transmission by the second UE

1605

Identify a metric associated with system congestion of the sidelink control channel

1610

Compare the metric to a threshold system congestion

1615

Transmit the message indicative of the resource overlap to one or more UEs on the sidelink feedback channel based on the metric being less than a threshold system congestion

1620

Transmit a message indicative of a resource overlap on a sidelink feedback channel based on the resource overlap indicated in the sidelink control information, the resource overlap occurring between sidelink transmissions scheduled on a sidelink resource of the set of sidelink resources

RESOURCE COLLISION INDICATION USING FEEDBACK

CROSS REFERENCE

The present Application for Patent claims the benefit of U.S. Provisional Patent Application No. 63/056,486 by Sarkis et al., entitled "RESOURCE COLLISION INDICATION USING FEEDBACK," filed Jul. 24, 2020, assigned to the assignee hereof, and expressly incorporated by reference herein.

INTRODUCTION

The following relates to wireless communications, including indications of resource collision.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method of wireless communications at a first user equipment (UE) is described. The method may include receiving sidelink control information from a second UE in a sidelink control channel, the sidelink control information indicating a set of sidelink resources reserved for transmission by the second UE, and transmitting a message on a sidelink feedback channel based on a resource overlap indicated in the sidelink control information, the resource overlap occurring between sidelink transmissions scheduled on a sidelink resource of the set of sidelink resources.

An apparatus for wireless communications at a first UE is described. The apparatus may include a processor and memory coupled to the processor. The processor and memory may be configured to cause the apparatus to receive sidelink control information from a second UE in a sidelink control channel, the sidelink control information indicating a set of sidelink resources reserved for transmission by the second UE, and transmit a message indicative of a resource overlap on a sidelink feedback channel based on a resource overlap indicated in the sidelink control information, the resource overlap occurring between sidelink transmissions scheduled on a sidelink resource of the set of sidelink resources.

Another apparatus for wireless communications at a first UE is described. The apparatus may include means for receiving sidelink control information from a second UE in a sidelink control channel, the sidelink control information indicating a set of sidelink resources reserved for transmission by the second UE, and transmitting a message indicative of a resource overlap on a sidelink feedback channel based on a resource overlap indicated in the sidelink control information, the resource overlap occurring between sidelink transmissions scheduled on a sidelink resource of the set of sidelink resources.

A non-transitory computer-readable medium storing code for wireless communications at a first UE is described. The code may include instructions executable by a processor to receive sidelink control information received from a second UE in a sidelink control channel, the sidelink control information indicating a set of sidelink resources reserved for transmission by the second UE, and transmit a message indicative of a resource overlap on a sidelink feedback channel based on a resource overlap indicated in the sidelink control information, the resource overlap occurring between sidelink transmissions scheduled on a sidelink resource of the set of sidelink resources.

In some examples of the method, apparatuses, and non-transitory computer-readable medium described herein the message indicative of the resource overlap comprises a negative acknowledgement message transmitted on a sidelink feedback channel.

Some examples of the method, apparatuses, and non-transitory computer-readable medium described herein may further include operations, features, means, or instructions for transmitting the message indicative of the resource overlap on the sidelink feedback channel based on the first UE being of a category of UEs designated to provide an indication of the resource overlap.

Some examples of the method, apparatuses, and non-transitory computer-readable medium described herein may further include operations, features, means, or instructions for receiving, in the sidelink control information, a destination identifier for the sidelink transmissions indicating a recipient of the one or more transmissions, comparing the destination identifier for the sidelink transmissions to an identifier of the first UE, determining that the first UE may be an intended recipient of at least one of the sidelink transmissions, and transmitting the negative acknowledgement message based on the category of UEs including intended recipients of at least one of the sidelink transmissions resulting in the resource overlap.

Some examples of the method, apparatuses, and non-transitory computer-readable medium described herein may further include operations, features, means, or instructions for transmitting the negative acknowledgement message based on the category of UEs including UEs that may be intended recipients of at least one of the sidelink transmissions resulting in the resource overlap and other UEs.

Some examples of the method, apparatuses, and non-transitory computer-readable medium described herein may further include operations, features, means, or instructions for transmitting the negative acknowledgement message based on the category of UEs including UEs that may be designated via a configuration to provide the indication of the resource overlap.

Some examples of the method, apparatuses, and non-transitory computer-readable medium described herein may further include operations, features, means, or instructions for receiving a retransmission of at least one of the sidelink transmissions based on transmitting the message.

Some examples of the method, apparatuses, and non-transitory computer-readable medium described herein may further include operations, features, means, or instructions for transmitting the message indicative of the resource overlap to all UEs providing the sidelink transmissions involved in the resource overlap.

Some examples of the method, apparatuses, and non-transitory computer-readable medium described herein may further include operations, features, means, or instructions for identifying a priority associated with one or more transmissions of the sidelink transmissions, comparing the identified priority to a threshold priority, and transmitting the message indicative of the resource overlap to one or more UEs on the sidelink feedback channel based on the identified priority satisfying the threshold priority.

Some examples of the method, apparatuses, and non-transitory computer-readable medium described herein may further include operations, features, means, or instructions for identifying a signal power associated with one or more transmissions of the sidelink transmissions, comparing the identified signal power to a threshold signal power, and transmitting the message indicative of the resource overlap to one or more UEs based on the identified signal power satisfying the threshold signal power.

Some examples of the method, apparatuses, and non-transitory computer-readable medium described herein may further include operations, features, means, or instructions for determining the threshold signal power based on a reference signal received power (RSRP) measurement associated with the one or more transmissions of the sidelink transmissions.

Some examples of the method, apparatuses, and non-transitory computer-readable medium described herein may further include operations, features, means, or instructions for determining a set of geographic locations for one or more UEs, the location of the one or more UEs being associated with a zone identifier, and transmitting the message indicative of the resource overlap to the one or more UEs based on the zone identifier.

Some examples of the method, apparatuses, and non-transitory computer-readable medium described herein may further include operations, features, means, or instructions for identifying a metric associated with system congestion of the sidelink control channel, comparing the metric to a threshold system congestion, and transmitting the message indicative of the resource overlap to one or more UEs on the sidelink feedback channel based on the metric being less than a threshold system congestion. In some examples, the metric comprising a channel occupation ratio (CR), a channel busy ratio (CBR), or both.

Some examples of the method, apparatuses, and non-transitory computer-readable medium described herein may further include operations, features, means, or instructions for transmitting the message indicative of the resource overlap on the sidelink feedback channel based on a distance between the first UE and the second UE, a location of the first UE and the second UE, or both.

Some examples of the method, apparatuses, and non-transitory computer-readable medium described herein may further include operations, features, means, or instructions for determining, based on the sidelink control information, that the resource overlap between the sidelink transmissions scheduled in the sidelink resource may be to occur in the future, and transmitting the message indicative of the resource overlap on the sidelink feedback channel based on the determination.

In some examples of the method, apparatuses, and non-transitory computer-readable medium described herein, the resource overlap may comprise a time overlap, a frequency overlap, or both.

Some examples of the method, apparatuses, and non-transitory computer-readable medium described herein may further include operations, features, means, or instructions for determining the resource overlap based on interference cancellation.

BRIEF DESCRIPTION OF THE DRAWINGS

FIGS. 3A and 3B illustrate example sidelink resource configurations that support resource collision indication using feedback in accordance with one or more aspects of the present disclosure.

FIGS. 5 and 6 show block diagrams of devices that support resource collision indication using feedback in accordance with one or more aspects of the present disclosure.

FIGS. 9 through 16 show flowcharts illustrating methods that support resource collision indication using feedback in accordance with one or more aspects of the present disclosure.

DETAILED DESCRIPTION

Figure 1:
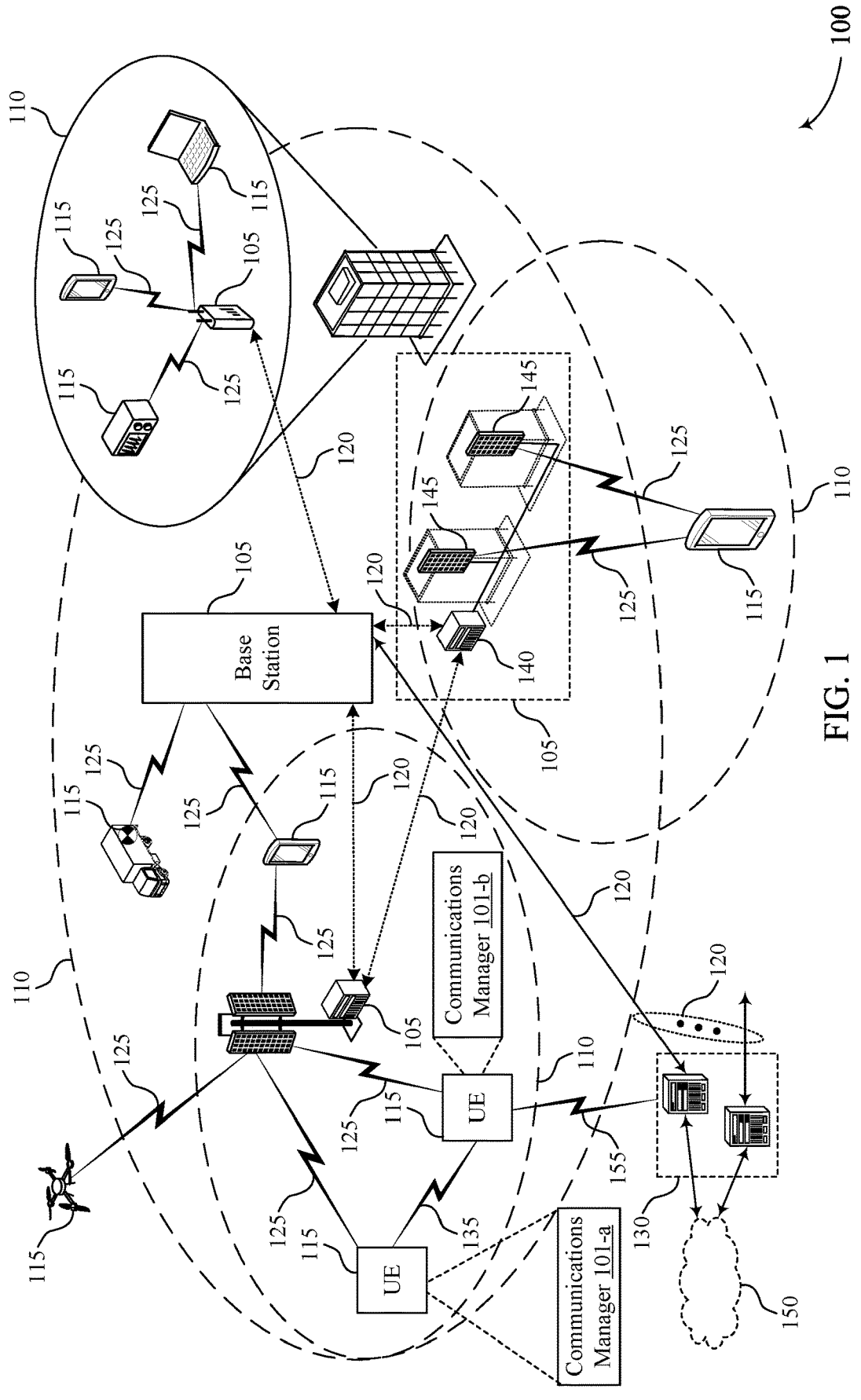
FIG. 1 illustrates an example of a wireless communications system that supports resource collision indication using feedback in accordance with one or more aspects of the present disclosure.

A wireless communications system may support sidelink communications. The sidelink communications may include the use of one or more sidelink channels for transmitting data, for example, between one or more sidelink user equipment (UE). Communications between sidelink UEs may be reservation-based, such that the resources used for transmissions may be scheduled by a network entity, or the resources may be autonomously reserved (e.g., used for sidelink transmissions) by sidelink UEs. In some cases, a UE may receive control signaling such as sidelink control information (SCI) that indicates a set of resources available for reservation from a sidelink resource pool. The set of resources available for reservation also indicates those resources that have already been reserved by other UEs.

In some examples, the wireless communications system may support preemption of scheduled sidelink transmissions. For example, in some cases, a UE having a high priority sidelink transmission (e.g., a sidelink transmission with a priority level exceeding a threshold priority, or a sidelink transmission that is indicated to have low latency or increased reliability targets) may preempt a different, lower priority transmission from a different UE that is scheduled on a same resource. That is, a UE having the higher priority transmission may reserve the resource even after a UE having the lower priority transmission reserves the resource, and the higher priority transmission may be transmitted in place of the lower priority transmission. In some cases, however, the opposite may inadvertently occur. For example, a UE having a lower priority transmission may attempt to reserve a resource that is reserved by a higher priority transmission. In some examples, a UE may not receive the SCI indicating to it that a sidelink resource has been reserved for higher priority traffic. In that scenario, and without intending to preempt the higher priority traffic, the UE with lower priority traffic may attempt to reserve the same resource. The resultant resource collision (e.g., a resource overlap) in time, frequency, or both, could go unnoticed by either of the two UEs.

However, other UEs may identify the resource collision, and could then notify the UEs whose reservations resulted in the resource collision. Other UEs may receive the SCI from both of the UEs involved in the collision, and then, from the combined SCI, identify that a resource collision exists. To notify one or more other UEs of the collision, a UE that identifies the resource collision may transmit a message indicative of the resource collision, such as a negative acknowledgement (NACK) feedback message to the one or more UEs using a sidelink feedback channel (e.g., a physical sidelink feedback channel (PSFCH)) upon detecting the collision. In some examples, the UE that identifies the collision may transmit the NACK based on the identifying UE meeting certain criteria. For example, the identifying UE may transmit the NACK based on the identifying UE being an "intended" recipient of one or more of the colliding transmissions, meaning that the SCI indicates that one or more of the colliding transmissions are addressed to the UE. In other examples, the identifying UE may transmit the NACK regardless of whether the identifying UE was an intended recipient of a colliding transmission. In some other examples, the UE may be a "designated" UE, such that it is designated by the network (e.g., as a roadside unit (RSU), by configuration, or both) to signal a NACK upon detecting a collision.

A UE may evaluate a number of conditions in order to determine whether to send a NACK for an identified collisions. In one example, the UE may determine to transmit NACK feedback for each identified collision. In other examples, the UE may transmit NACK feedback for transmissions that are high priority transmissions (e.g., colliding transmissions that exceed a threshold priority level). In some other examples, the UE may determine whether to send a NACK based on a metric of received signal strength for one or more of the colliding transmissions. For example, in cases where the UE determines that the measured signal power exceeds a threshold received signal strength, the UE may transmit a NACK. In some other examples, the UE may determine whether to transmit a NACK based on measured congestion in the system or based on a number of UEs transmitting sidelink data in the system.

In yet other examples, the UE may determine whether to transmit a NACK based on factors such as the geographical location of the UEs involved in the resource collision, based on the distance between UEs, or both. For example, in cases where the UEs involved in the resource collision are spatially close (e.g., based on zone ID, a threshold distance, etc.), then the UE may transmit a NACK to report the collision.

Aspects of the disclosure are initially described in the context of wireless communications systems. For example, aspects of the disclosure are described in the context of communications between sidelink UEs. Aspects of the disclosure are further illustrated by and described with reference to apparatus diagrams, resource configurations, system diagrams, process flow diagrams, and flowcharts that relate to resource collision indication using feedback.

FIG. 1 illustrates an example of a wireless communications system 100 that supports resource collision indication using feedback in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 122 (e.g., via an S1, N2, N3, or other interface). The base stations 105 may communicate with one another over the backhaul links 122 (e.g., via an X2, Xn, or other interface) either directly (e.g., directly between base stations 105), or indirectly (e.g., via core network 130), or both. In some examples, the backhaul links 122 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM. In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service. A UE 115 may communicate with the core network 130 through communication link 155.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, frequency bands in the range of 300 megahertz (MHz) to 300 gigahertz (GHz). In some implementations, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With such aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A wireless communications system may support sidelink communications via a sidelink interface including one or more sidelink channels used for transmitting data in the system, for example, between one or more sidelink UEs 115. In some cases, a UE 115 may receive control signaling such as SCI that indicates a set of resources reserved by another UE 115 from a sidelink resource pool. The first UE 115 may be capable of supporting sidelink communications and may include a communications manager 101-a and a second UE 115 may be capable of supporting sidelink communications and may include a communications manager 101-b. The communications manager 101-a and the communications manager 101-b may implement one or more aspects of the present disclosure.

In some examples, the wireless communications system may support preemption for sidelink transmissions to reduce latency and increase reliability for high priority sidelink data. For example, in some cases, a UE 115 having a high priority sidelink transmission (e.g., a sidelink transmission with a priority level exceeding a threshold priority) may preempt a different, lower priority transmission from a different UE 115 that is scheduled on a same resource. In some cases, however, the UE 115 having a lower priority transmission may attempt to reserve or preempt a resource that is reserved by a higher priority transmission, and a resource collision (e.g., a resource overlap in time, frequency, or both) may occur for transmissions in a slot. The resource collision may also occur at random, or based on other system factors.

To notify one or more other UEs 115 of the collision, the UE 115 that identifies the resource collision may transmit a NACK feedback message to the one or more UEs 115 using a sidelink feedback channel upon detecting the collision. The UE 115 may determine to transmit NACK regardless of whether it is an intended recipient of one or more of the colliding transmissions. In addition, the UE 115 may determine whether to transmit NACK based on a number of system factors such as signal strength, channel congestion, transmission priority, geographical location of the UEs 115, or any combination thereof.

Figure 2:
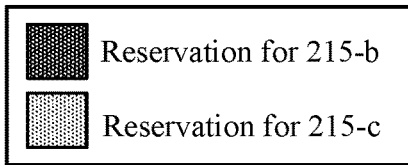
FIG. 2 illustrates an example of a wireless communications system that supports resource collision indication using feedback in accordance with one or more aspects of the present disclosure.

FIG. 2 illustrates an example of a wireless communications system 200 that supports resource collision indication using feedback in accordance with one or more aspects of the present disclosure. In some examples, wireless communications system 200 may implement aspects of wireless communications system 100. The wireless communications system 200 may support various examples of resource collision indication using feedback implemented at UEs 215-a, 215-b, 215-c, 215-d, and 215-e, which may be referred to as UEs 215, and may be examples of a UE 115 as described with reference to FIG. 1. Although the example of wireless communications system 200 illustrates three UEs 215, the techniques described herein may be applicable to any quantity of UEs 215.

In wireless communications system 200, UEs 215 may be configured for sidelink communications via a sidelink interface including one or more logical channels such as a physical sidelink control channel (PSCCH), a physical sidelink discovery channel (PSDCH), a physical sidelink shared channel (PSSCH), a physical sidelink broadcast channel (PSBCH), a PSFCH, or any combination thereof. Communications between sidelink UEs 215 may be reservation based such that the resources may be scheduled by a network entity such as a base station, or the resources may be autonomously reserved by sidelink UEs. In some cases, a UE such as UE 215-a may receive control signaling such as SCI 205 that indicates a set of resources for reservation by other UEs 215-b and 215-c, for example. The UE 215-a may receive SCI 205-b from UE 215-b and may also receive SCI 205-c from UE 215-c. After receiving one or both SCIs, the UE 215-a may compile a sidelink resource pool 210. The sidelink resource pool 210 identifies all of the resources that can be reserved by other UEs 215-b and 215-c (and possibly additional UEs) for sidelink communications (e.g., the sidelink resource pool 210 may be a set of all reservable resources). The resources may be in units of sub-channels in the frequency domain and slots in the time domain. Each sub-channel may further contain a number of physical resource blocks (PRBs) for reservation by the UE.

The sidelink resource pool 210 may include all useable and reservable sidelink resources for the UE, where each resource reservation is included in the SCI. For example, the UE may use resources from sidelink resource pool 210 for initial transmissions from a UE and for up to two retransmissions in future slots. In the example of FIG. 2, the sidelink resource pool 210 includes resources reservable for both UE 215-b and 215-c, where each reservation is included in SCI 205-b, 205-c. Additionally, the resource reservations may be based on periodic reservations, which repeat during a signaling period for the sidelink transmissions or for receiving sidelink control information.

In some examples, the wireless communications system 200 may support preemption for sidelink transmissions to reduce latency and increase reliability for high priority sidelink data. For example, in some cases, a UE having a high priority sidelink transmission (e.g., a sidelink transmission with a priority level exceeding a threshold priority) may preempt a different, lower priority transmission on a same resource. That is, a UE having the higher priority transmission may reserve the resource even after a UE having the lower priority transmission reserves the resource, and the higher priority transmission may be transmitted in place of the lower priority transmission.

In some cases, however, one UE may miss (e.g., fail to identify) a reservation from another UE based on a number of factors. For example, one of the UEs 215-b, 215-c may be configured for half-duplex communications, or the network may be configured for intra-UE prioritization. Additionally or alternatively, one of the UEs 215-b, 215-c may improperly decode SCI due to noise or interference, or due to the presence of multiple SCIs in the same PSCCH, where the UE 215-b, 215-c improperly determines a lower priority transmission from one of the multiple SCIs. In some other cases, the UE 215-b, 215-c may be spatially far from the other transmitting sidelink UEs 215, and may fail to decode the SCI due to low signal power.

In cases where one of the UEs 215-b, 215-c attempts to reserve or preempt a resource that is reserved by a higher priority transmission, or in cases where one of the UEs 215-b, 215-c misses a previous reservation, a resource collision 220 (e.g., a resource overlap) may occur for transmissions scheduled for the resource pool 210 (e.g., a time-frequency overlap between the reservations for 215-b and 215-c may occur). In some other cases, the resource collision 220 may be a random collision (e.g., independent of reservations made for the resource). In some cases, the UE 215-a may be an intended recipient of one or more of the colliding transmissions, or the UE 215-a may identify or observe the resource collision for different sidelink UEs (e.g., UEs 215-b and 215-c).

To notify one or more other UEs of the collision 220, the UE 215-a may transmit a message indicating the resource collision such as NACK feedback message 225 (NACK feedback message 225-b, 225-c) to the one or more UEs using a sidelink feedback channel (e.g., a PSFCH) upon detecting the collision 220. In some examples, the UE 215-a may determine that it is an intended recipient of one or more of the colliding transmissions (e.g., from UE 215-b, UE 215-c, etc.), and may transmit the NACK 225 to prompt a retransmission from the UE 215-b. In some other examples, the UE 215-a may determine that it is not an intended recipient of a colliding transmission (e.g., based on decoding control information from a sidelink transmission). In such cases, the UE 215-a may transmit NACK feedback 225-b, 225-c to UEs 215-b and 215-c, respectively, to notify the UEs 215-b and 215-c of the collision. In some other examples, the UE 215-a may transmit a NACK upon identifying a resource collision between transmissions, regardless of whether the UE 215-a is an intended recipient of one or more of the colliding transmissions. In some cases, a UE 215-a may be configured with a capability such as successive interference cancellation, such that the UE 215-a may decode transmissions from one or both of UEs 215-b and 215-c.

In some examples, the UE 215-a may identify the collision based on decoding control information for the colliding transmissions. For example, the UE 215-a may decode SCI 205 for one or more of the colliding transmissions, and may identify that a collision has occurred based on decoding the SCI 205. The UE 215-a may determine whether to send NACK upon decoding the SCI 205 and identifying the collision. In some other examples, the UE 215-a may receive control information that indicates a future resource collision. For example, the UE 215-a may decode SCI 205 in advance of the resource collision, and may determine whether to transmit NACK based on decoding the SCI 205 ahead of the collision. In some other examples, the UE 215-a may decode SCI for a first colliding transmission before the collision, and the UE 215-a may decode SCI for a second colliding transmission during or after the collision. The UE 215-a may determine whether to send NACK based on decoding the SCIs for the colliding transmissions.

In some other examples, the UE 215-a may be a "designated" UE, such that it is designated by the network (e.g., as an RSU, by configuration, or both) to signal a NACK upon detecting a collision. For example, the UE 215-a may receive a configuration message from a base station or another sidelink UE that indicates that the UE 215-a is designated to monitor for resource collisions, and is indicated to transmit NACK (e.g., NACK 225, 230) to one or more UEs in the system upon detecting the collisions.

In some cases, the UE 215-a may evaluate a number of conditions in order to determine whether to send NACK for an identified collisions. In one example, the UE 215-a may determine to transmit NACK feedback for each identified collision. In other examples, the UE 215-a may transmit NACK feedback for transmissions based on a priority level associated with the colliding transmissions. For example, the UE 215-a may compare priority levels associated with the colliding transmission with a threshold priority level. The threshold priority may be configured (e.g., dynamically or statically) by the network, and may identify which transmissions are identified as high priority and which transmissions are identified as low priority. For example, "high priority" may include transmissions that meet or exceed the priority threshold, and "low priority" may include transmissions that do not meet or are less than the priority threshold.

In cases where the priority levels associated with one or more of the colliding transmissions exceed the priority threshold (e.g., one or more transmissions has a higher priority than the threshold), the UE 215-a may determine to transmit NACK feedback for the collision. In other cases where the priority levels associated with one or more of the colliding transmissions is below the priority threshold (e.g., one or more transmissions has lower priority than the threshold), the UE 215-a may determine to refrain from sending NACK feedback for the collision to conserve system resources. In such examples, the UE 215-a may send NACK feedback for transmissions associated with high priority (e.g., priority exceeding a threshold) or low latency transmissions. In such cases, the UE 215-*a* may selectively transmit NACK for identified high priority resource collisions, which may reduce the number of NACKs sent in a given time period for low priority transmissions, reducing system congestion an conserve power of the UE 215-*a*.

In some other examples, UE 215-*a* may determine whether to send NACK based on a metric of received signal strength (e.g., a reference signal receive power (RSRP)) for one or more of the colliding transmissions. In some cases, the UE 215-*a* may compare the received signal strength for the one or more colliding transmissions to a threshold receive power, and may determine whether to transmit NACK based on the comparison. For example, in cases where the UE 215-*a* determines that the measured signal power for the one or more colliding transmissions exceeds the threshold received signal strength (e.g., from spatially close UE 215-*c* or 215-*d*, for example), the UE 215-*a* may transmit NACK. In some other cases where the UE 215-*a* determines that the measured signal power for the one or more colliding transmissions is below the threshold received signal strength, the UE 215-*a* may refrain from transmitting NACK. In such cases, the UE 215-*a* may determine that the collision involves a weak signal (e.g., from spatially distant UE 215-*b* or 215-*e*, for example, that may contribute to low level interference), and that the weak signal has a trivial impact on ongoing communications such that the UE 215-*a* may refrain from transmitting NACK.

In some other examples, the UE 215-*a* may determine whether to transmit NACK based on the geographical location of the UEs involved in the resource collision. For example, the UE 215-*a* may determine zone IDs for UEs involved in the resource collision, and may identify a threshold distance or a rule associated with the zone IDs. In cases where the UE 215-*a* determines that the UEs involved in the resource collision are spatially distant (e.g., the UEs involved in the resource collision have mismatched zone IDs such as UEs 215-*a* and 215-*e*), the UE 215-*a* may determine to not transmit a NACK. In cases where the UE 215-*a* determines that the UEs involved in the resource collision are spatially close (e.g., the UEs involved in the resource collision have matching zone IDs such as UE 215-*a* and 215-*d*), the UE 215-*a* may determine to transmit a NACK to report the collision.

In cases where UE 215-*a* is not an intended recipient of one or more of the colliding transmissions, the UE 215-*a* may determine whether to send the NACK based on the distance between UEs involved in the identified resource collision (e.g., if the distance between UE 215-*a* and the UEs with colliding transmissions is larger than a threshold, the UE 215-*a* may refrain from sending NACK). In some other cases where the UE 215-*a* is an intended recipient of one or more of the colliding transmissions, the UE 215-*a* may determine whether to send the NACK based on the distance to other UEs (e.g., UE 215-*b*, UE 215-*c*, 215-*d*, 215-*e*, or both) involved in the identified resource collision (e.g., if the distance between UE 215-*a* and the UEs 215-*b*, 215-*c*, 215-*d*, or 215-*e* with colliding transmissions is larger than a threshold, the UE 215-*a* may refrain from sending NACK). In one example, the UE 215-*a* may identify a colliding transmission involving UE 215-*d*. The UE 215-*a* may determine that the UE 215-*d* is spatially close (e.g., distance 235 is less than a threshold distance), and the UE 215-*a* may transmit a NACK for the transmission associated with UE 215-*d*. In another example, the UE 215-*a* may identify a colliding transmission involving UE 215-*e*. The UE 215-*a* may determine that the UE 215-*e* is spatially far away (e.g., distance 240 exceeds a threshold distance), and the UE 215-*a* may transmit a NACK for the transmission associated with UE 215-*e*.

In some other examples, the UE 215-*a* may determine whether to transmit NACK based on measured congestion in the system or based on a number of UEs transmitting sidelink data in the system. For example, the UE 215-*a* may determine that the channel congestion exceeds a threshold CBR or a threshold CR, and based on this determination, the UE 215-*a* may refrain from sending the NACK. In some other cases, the UE 215-*a* may wait to send the NACK until the UE 215-*a* determines that the channel is no longer busy.

FIGS. 3A and 3B illustrate examples of sidelink resource configurations 300-*a* and 300-*b* that support resource collision indication using feedback in accordance with one or more aspects of the present disclosure. In some examples, sidelink resource configurations 300-*a* and 300-*b* may implement aspects of wireless communications system 100, for example, the sidelink resource configurations may be examples of sidelink resource pool 210 described with reference to FIG. 2. The sidelink resource configurations 300-*a* and 300-*b* may support various examples of resource collision indication using feedback implemented at devices such as UEs described with reference to FIGS. 1 and 2.

A wireless communications system may support resource scheduling for sidelink communications between devices. For example, in the resource scheduling may be reservation based, such that devices may reserve resources for transmission of sidelink data. In the example of sidelink communications, resource allocation may be associated with slots in the time domain and subchannels (including a number of resource blocks) in the frequency domain.

FIG. 3A shows an example of resource configuration 300-*a* which includes a sidelink resource pool 310-*a* usable by a UE to reserve sidelink resources or to identify already reserved sidelink resources. In sidelink resource pool 310-*a*, resource reservations are indicated (e.g., via reservations 330 or 335) in a current slot or up to a number of future slots (e.g., up to two future slots) for the transmission of sidelink data. In some cases, a first UE may reserve resources associated with reservation 330, and a second UE may reserve resources associated with reservation 335. In some other cases, resource allocation may be based on a periodicity.

In some examples, the sidelink resources may be scheduled by a base station, or in some other cases the resources may be selected by a UE from a configured sidelink resource pool. The UE may in some cases receive an allocation of resources via a dynamic grant or the UE may autonomously select resources for sidelink transmissions.

FIG. 3B shows an example of resource configuration 300-*b*, which includes a sidelink resource pool 310-*b* may include all reservable resources usable by a UE or to identify already reserved sidelink resources. In sidelink resource pool 310-*b*, resource reservations are indicated (e.g., via reservations 340 or 345). However, in sidelink resource pool 310-*b*, two reservations share a same resource (at collision 325). A first UE may miss (e.g., fail to identify) a reservation 340 from another UE based on a number of factors during resource sensing, and a resource collision 325 (e.g., a collision in time, frequency, or both) may occur between reservations 340 and 345. In some other cases, the resource collision 325 may randomly occur (e.g., independent of reservations made for the resource).

In cases where the collision 325 occurs, a UE may identify the collision and transmit negative feedback via a sidelink feedback channel (e.g., the PSFCH). In some cases, the NACK may be transmitted as a sequence-based signal. For example, the NACK may be transmitted on the PSFCH using a different cyclic shift than that of an acknowledgement transmission of the same base sequence. Additionally or alternatively, the UE may apply code division multiplexing (CDM) for the NACK transmission.

Figure 4:
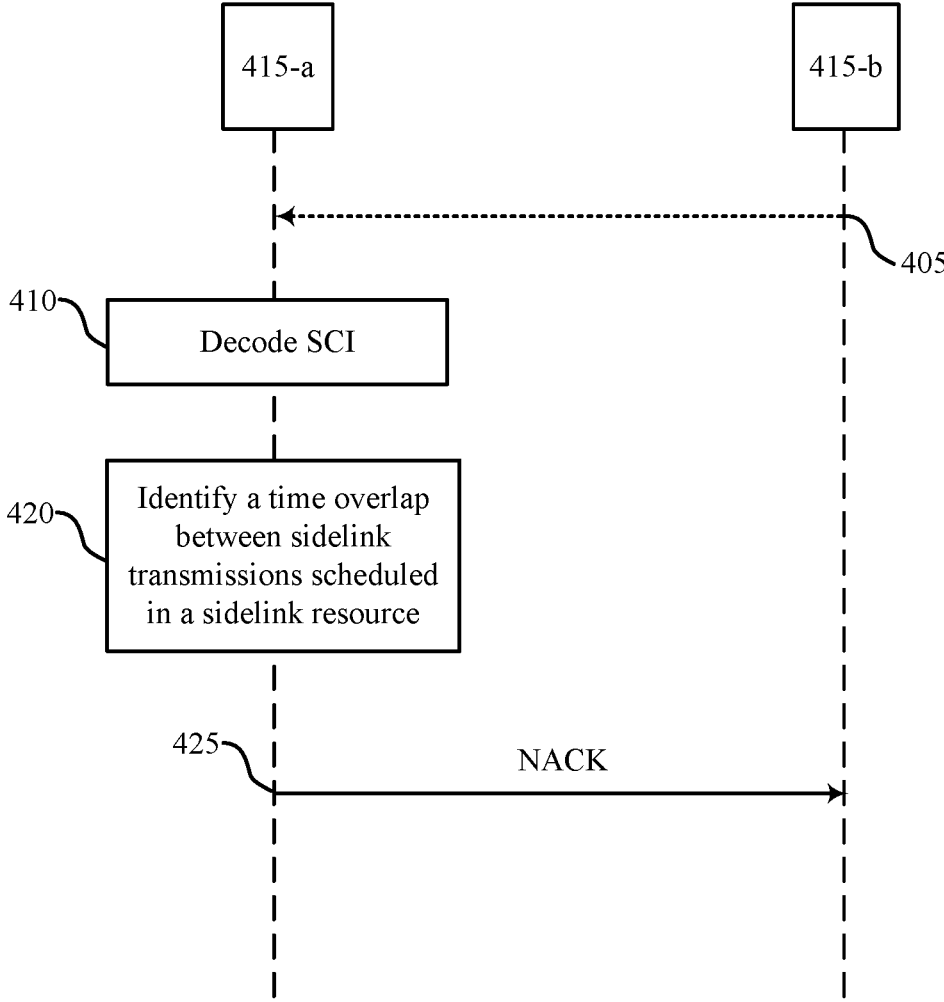
FIG. 4 illustrates an example of a process flow that supports resource collision indication using feedback in accordance with one or more aspects of the present disclosure.

FIG. 4 illustrates an example of a process flow 400 that supports resource collision indication using feedback in accordance with one or more aspects of the present disclosure. In some examples, process flow 400 may implement aspects of wireless communications system 100. The sidelink resource configuration 300 may support various examples of resource collision indication using feedback, including sidelink communications between UEs 415-a and 415-b, which may be examples of UEs 215 and UEs 115 described with reference to FIGS. 1 and 2, respectively.

At 405, UE 415-b may transmit SCI to the UE 415-a via a sidelink control channel (e.g., a PSCCH), and the UE 415-a may receive the SCI on the sidelink control channel.

At 410, the UE 415-a may receive the SCI from UE 415-a in the sidelink control channel. In some examples, the SCI may indicate a set of sidelink resources that are reserved for transmission by UE 415-b.

At 420, the UE 415-a may identify, based on the SCI, a resource overlap (e.g., a time overlap, a frequency overlap, or both) between sidelink transmissions scheduled to occur in a sidelink resource of the set of sidelink resources. In some aspects, the resource overlap may be a resource collision between reserved resources of a sidelink channel. In some examples, the UE 415-a may determine, based at least in part on the SCI, that the resource overlap scheduled in the sidelink resource is occurring presently, has occurred in the past, or will occur in the future. In some cases, the UE 415-a may implement techniques such as interference cancellation to identify the resource overlap At 425, the UE 415-a may transmit a message to UE 415-b (and/or other UEs in the wireless communications system) using the sidelink feedback channel and based on identifying the resource overlap. In some examples, the message may be a feedback message indicative of the resource overlap.

In some other examples, the message transmitted at 425 may be a NACK feedback message. In some cases, the UE 415-a determine that it is associated with a category of UEs that are designated to provide the indication of the resource overlap, and the UE 415-a may transmit the NACK based on determining that it is designated to provide the indication. In some cases, the UE 415-a may be designated via a configuration to provide the indication of the resource overlap In some examples, the UE 415-a may receive a destination ID (e.g., as part of the SCI) associated with the one or more transmissions affected by the resource overlap. The UE 415-a may compare the destination ID for the one or more transmissions to its own identifier. In some cases, the UE 415-a may determine that its identifier matches the destination ID, and may further determine that it is an intended recipient of one or more of the transmissions affected by the resource overlap. The UE 415-a may transmit NACK based on determining that it is an intended recipient of the one or more transmissions.

In some other examples, the UE 415-a may identify a mismatch between the received destination ID and the identifier of the UE 415-a. In such examples, the UE 415-a may determine that is not an intended recipient of the one or more transmissions, and may still transmit a NACK message based on determining that it is not an intended recipient.

In some implementations, the UE 415-a may identify a priority (e.g., in SCI) associated with the one or more sidelink transmissions. The UE 415-a may compare the identified priority to a threshold priority, and may transmit a NACK on the PSFCH in cases where the identified priority satisfies the threshold priority. For example, the UE 215-a may transmit NACK for high priority transmissions, and may selectively transmit NACK for lower priority transmissions.

In some other implementations, the UE 415-a may identify a signal power associated with the one or more sidelink transmissions. For example, the UE 415-a may measure an RSRP value associated with the one or more sidelink transmissions. The UE 415-a may compare the measured signal power to a threshold signal power, and may transmit a NACK to the UE 415-b (or one or more other UEs) based on the signal power satisfying the threshold signal power. For example, the UE 415-a may determine that the signal power is weak enough such that the collision is unlikely to affect overall signaling performance. In such cases, the UE 415-a may refrain from transmitting NACK for the transmission.

In some other implementations, the UE 415-a may determine a set of geographic locations for one or more UEs associated with a zone ID. The UE 415-a may selectively transmit the NACK based on the zone ID associated with transmitting UEs and the colliding transmissions.

In some other implementations, the UE 415-a may identify a metric associated with system congestions of the sidelink control channel, for example, a CR, a CBR, or both, and may compare the metric to a threshold system congestion. The UE 415-a may transmit NACK based on the metric being less than the threshold system congestion (e.g., the UE 415-a sends NACK based on determining that the channel is free.

In some other implementations, the UE 415-a may transmit NACK based on a distance between a first UE and a second UE, a location of the first UE and the second UE, or both. For example, the UE 415-a may transmit NACK based on determining that the first UE and the second UE is within a threshold distance.

The UE 415-a may, in some cases, transmit a NACK to each UE providing the sidelink transmissions involved in the resource overlap, or may determine to transmit the NACK to a select group of UEs. The UE 415-a may, in some cases, receive a retransmission from the group of UEs based on transmitting the NACK.

FIG. 5 shows a block diagram 500 of a device 505 that supports resource collision indication using feedback in accordance with one or more aspects of the present disclosure. The device 505 may be an example of one or more aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to resource collision indication using feedback, etc.). Information may be passed on to other components of the device 505. The receiver 510 may be an example of one or more aspects of the transceiver 820 described with reference to FIG. 8. The receiver 510 may utilize a single antenna or a set of antennas.

The communications manager 515 may receive sidelink control information from a second UE in a sidelink control channel, the sidelink control information indicating a set of sidelink resources reserved for transmission by the second UE, identify, based on the sidelink control information, a resource overlap between sidelink transmissions scheduled to occur in a sidelink resource of the set of sidelink resources, and transmit a message on a sidelink feedback channel based on identification of the resource overlap. The communications manager 515 may be an example of one or more aspects of the communications manager 810 described herein.

The communications manager 515 may be an example of means for performing various aspects of resource collision indication using feedback as described herein. The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

In another implementation, the communications manager 515, or its sub-components, may be implemented in code (e.g., as communications management software or firmware) executed by a processor, or any combination thereof. If implemented in code executed by a processor, the functions of the communications manager 515, or its sub-components may be executed by a general-purpose processor, a DSP, an ASIC, an FPGA or other programmable logic device.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of one or more aspects of the transceiver 820 described with reference to FIG. 8. The transmitter 520 may utilize a single antenna or a set of antennas.

In some examples, the communication manager 515 may be configured to perform various operations (e.g., decoding, identifying, transmitting) using or otherwise in cooperation with the receiver 510, the transmitter 520, or both.

Figure 6:
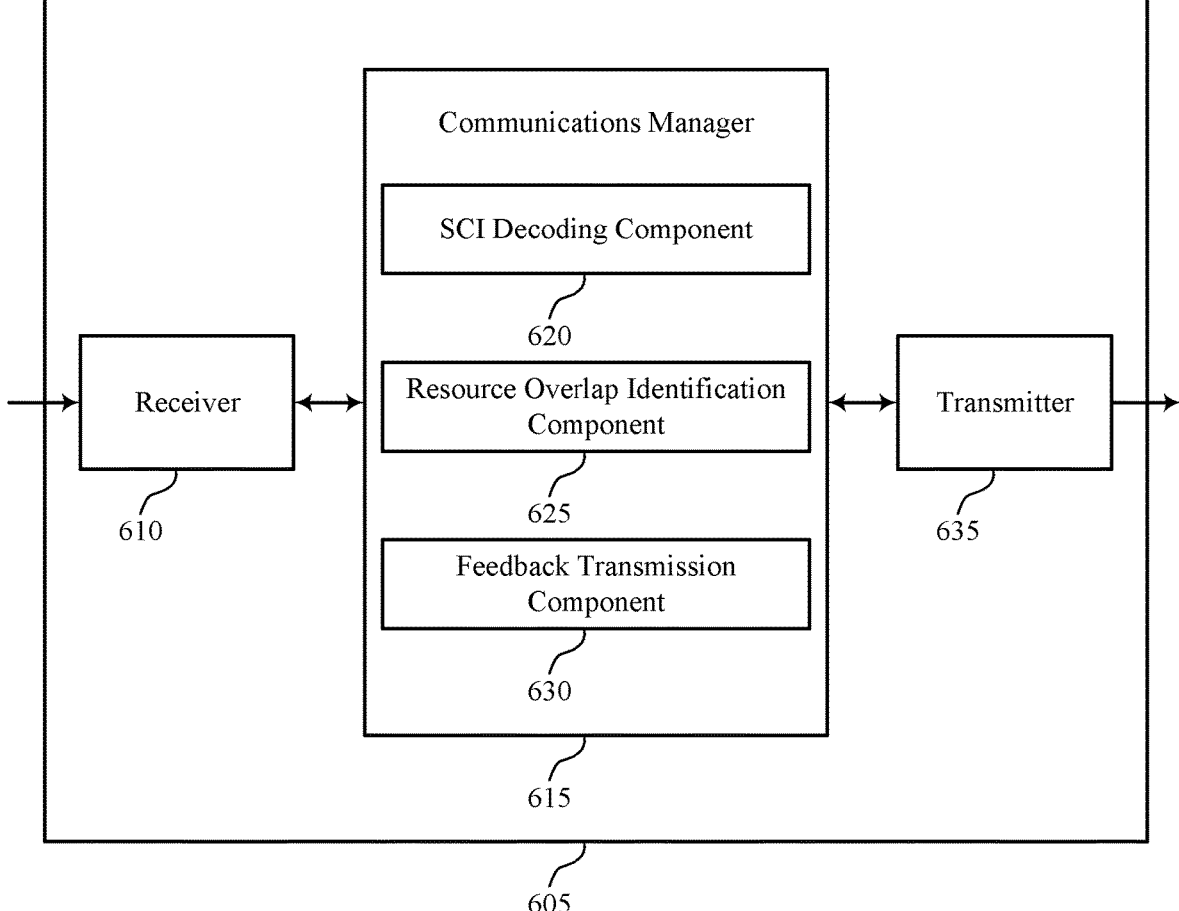

FIG. 6 shows a block diagram 600 of a device 605 that supports resource collision indication using feedback in accordance with one or more aspects of the present disclosure. The device 605 may be an example of one or more aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to resource collision indication using feedback, etc.). Information may be passed on to other components of the device 605. The receiver 610 may be an example of one or more aspects of the transceiver 820 described with reference to FIG. 8. The receiver 610 may utilize a single antenna or a set of antennas.

The communications manager 615 may be an example of one or more aspects of the communications manager 515 as described herein. The communications manager 615 may include a SCI decoding component 620, a resource overlap identification component 625, and a feedback transmission component 630. The communications manager 615 may be an example of one or more aspects of the communications manager 810 described herein.

The SCI decoding component 620 may decode sidelink control information received from a second UE in a sidelink control channel, the sidelink control information indicating a set of sidelink resources reserved for transmission by the second UE.

The resource overlap identification component 625 may identify, based on the sidelink control information, a resource overlap between sidelink transmissions scheduled to occur in a sidelink resource of the set of sidelink resources.

The feedback transmission component 630 may transmit a message on a sidelink feedback channel based on identification of the resource overlap.

The transmitter 635 may transmit signals generated by other components of the device 605. In some examples, the transmitter 635 may be collocated with a receiver 610 in a transceiver module. For example, the transmitter 635 may be an example of one or more aspects of the transceiver 820 described with reference to FIG. 8. The transmitter 635 may utilize a single antenna or a set of antennas.

In some examples, communications manager 615 may be implemented as an integrated circuit or chipset for a mobile device modem, and the receiver 610 and transmitter 620 may be implemented as analog components (e.g., amplifiers, filters, antennas, etc.) coupled with the mobile device modem to enable wireless transmission and reception.

The communications manager 615 as described herein may be implemented to realize one or more potential advantages. Various implementations may enable a device such as device 605 to effectively notify the network or a secondary device of a resource collision for a sidelink resource. At least one implementation may enable the communications manager 615 to effectively increase reliability and reduce latency for transmissions between sidelink devices. For example, the transmission of feedback may enable a sidelink device to identify a collision and effectively retransmit data based on the identified collision.

Based on implementing the resource collision indication techniques as described herein, one or more processors of the device 605 (e.g., processor(s) controlling or incorporated with one or more of receiver 610, communications manager 615, and transmitter 620) may efficiently report resource collisions in the wireless communications network. In addition, the resource collision indication techniques may reduce overhead for reporting collisions, and the transmission of NACK may be supported by a wide range of devices in the network.

Figure 7:
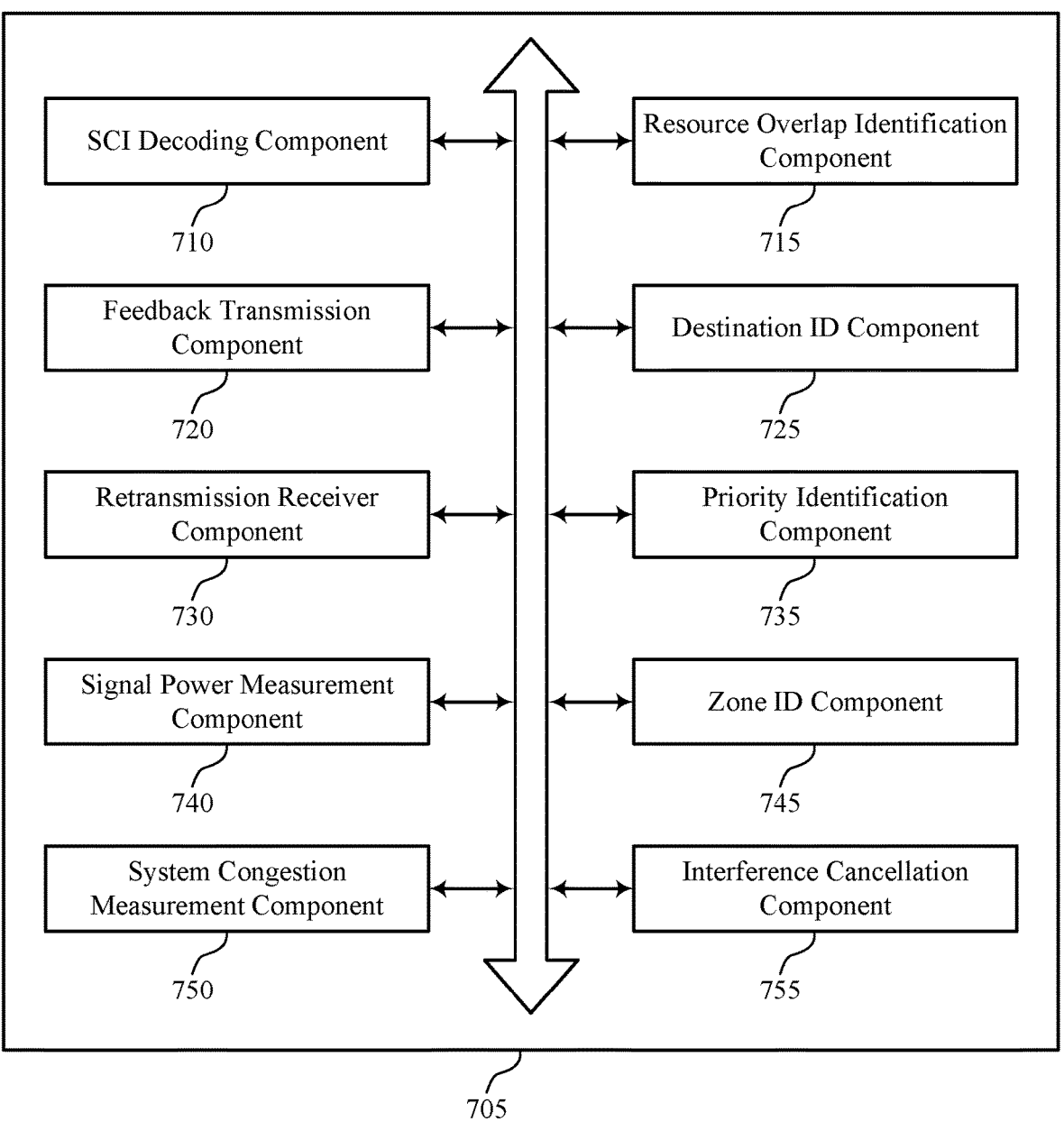
FIG. 7 shows a block diagram of a communications manager that supports resource collision indication using feedback in accordance with one or more aspects of the present disclosure.

FIG. 7 shows a block diagram 700 of a communications manager 705 that supports resource collision indication using feedback in accordance with one or more aspects of the present disclosure. The communications manager 705 may be an example of one or more aspects of a communications manager 515, a communications manager 615, or a communications manager 810 described herein. The communications manager 705 may include a SCI decoding component 710, a resource overlap identification component 715, a feedback transmission component 720, a destination ID component 725, a retransmission receiver component 730, a priority identification component 735, a signal power measurement component 740, a zone ID component 745, a system congestion measurement component 750, and an interference cancellation component 755. Each of these modules may communicate, directly or indirectly, with one another (e.g., via one or more buses).

The SCI decoding component 710 may receive sidelink control information from a second UE in a sidelink control channel, the sidelink control information indicating a set of sidelink resources reserved for transmission by the second UE.

In some examples, the SCI decoding component 710 may receive, in the sidelink control information, a destination identifier for the sidelink transmissions indicating a recipient of the one or more transmissions. The destination ID component 725 may compare the destination identifier for the sidelink transmissions to an identifier of the first UE. In some examples, the destination ID component 725 may determine that the first UE is an intended recipient of at least one of the sidelink transmissions.

The resource overlap identification component 715 may identify, based on the sidelink control information, a resource overlap between sidelink transmissions scheduled to occur in a sidelink resource of the set of sidelink resources. In some examples, the resource overlap identification component 715 may determine, based on the sidelink control information, that the resource overlap between the sidelink transmissions scheduled in the sidelink resource is to occur in the future. In some examples, the interference cancellation component 755 may determine the resource overlap based on interference cancellation.

The feedback transmission component 720 may transmit a message on a sidelink feedback channel based on identification of the resource overlap. In some examples, the feedback transmission component 720 may transmit a NACK message on the sidelink feedback channel based on the first UE being of a category of UEs designated to provide an indication of the resource overlap.

In some examples, the feedback transmission component 720 may transmit the NACK message based on the category of UEs including intended recipients of at least one of the sidelink transmissions resulting in the resource overlap. In some examples, the feedback transmission component 720 may transmit the NACK message based on the category of UEs including UEs that are intended recipients of at least one of the sidelink transmissions resulting in the resource overlap and other UEs.

In some examples, the feedback transmission component 720 may transmit the NACK message based on the category of UEs including UEs that are designated via a configuration to provide the indication of the resource overlap. In some examples, the feedback transmission component 720 may transmit a NACK message to all UEs providing the sidelink transmissions involved in the resource overlap.

In some examples, the feedback transmission component 720 may transmit the message indicative of the resource overlap on the sidelink feedback channel based on a distance between the first UE and the second UE, a location of the first UE and the second UE, or both.

The priority identification component 735 may identify a priority associated with one or more transmissions of the sidelink transmissions. In some examples, the priority identification component 735 may compare the identified priority to a threshold priority. In some examples, the feedback transmission component 720 may transmit a NACK message to one or more UEs on the sidelink feedback channel based on the identified priority satisfying the threshold priority.

The signal power measurement component 740 may identify a signal power associated with one or more transmissions of the sidelink transmissions. In some examples, the signal power measurement component 740 may compare the identified signal power to a threshold signal power. In some examples, the feedback transmission component 720 may transmit a NACK message to one or more UEs based on the identified signal power satisfying the threshold signal power. In some examples, the signal power measurement component 740 may determine the threshold signal power based on an RSRP measurement associated with the one or more transmissions of the sidelink transmissions.

The zone ID component 745 may determine a set of geographic locations for one or more UEs, the location of the one or more UEs being associated with a zone identifier. In some examples, the feedback transmission component 720 may transmit a NACK message to the one or more UEs based on the zone identifier.

The system congestion measurement component 750 may identify a metric associated with system congestion of the sidelink control channel. In some examples, the system congestion measurement component 750 may compare the metric to a threshold system congestion. In some examples, the feedback transmission component 720 may transmit the message indicative of the resource overlap to one or more UEs on the sidelink feedback channel based on the metric being less than a threshold system congestion.

In some examples, the feedback transmission component 720 may transmit the message indicative of the resource overlap on the sidelink feedback channel based on the determination of the resource overlap. In some cases, the retransmission receiver component 730 may receive a retransmission of at least one of the sidelink transmissions based on transmitting the message.

Figure 8:
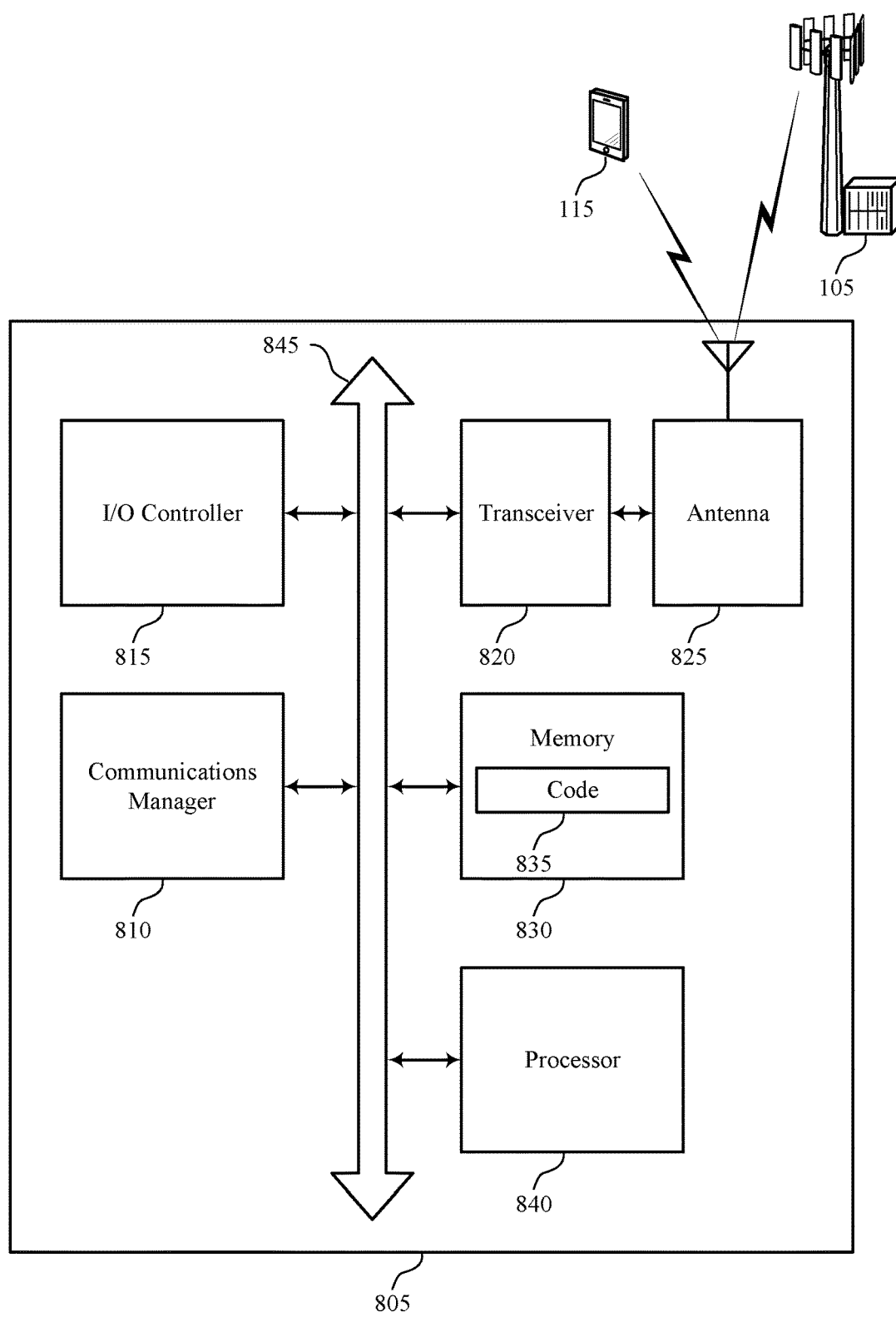
FIG. 8 shows a diagram of a system including a device that supports resource collision indication using feedback in accordance with one or more aspects of the present disclosure.

FIG. 8 shows a diagram of a system 800 including a device 805 that supports resource collision indication using feedback in accordance with one or more aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive sidelink control information from a second UE in a sidelink control channel, the sidelink control information indicating a set of sidelink resources reserved for transmission by the second UE, identify, based on the sidelink control information, a resource overlap between sidelink transmissions scheduled to occur in a sidelink resource of the set of sidelink resources, and transmit a message on a sidelink feedback channel based on identification of the resource overlap.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting resource collision indication using feedback).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

FIG. 9 shows a flowchart illustrating a method 900 that supports resource collision indication using feedback in accordance with one or more aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 905, the UE may receive sidelink control information from a second UE in a sidelink control channel, the sidelink control information indicating a set of sidelink resources reserved for transmission by the second UE. The operations of 905 may be performed according to the methods described herein. In some examples, aspects of the operations of 905 may be performed by a SCI decoding component as described with reference to FIGS. 5 through 8.

At 910, the UE may transmit a message on a sidelink feedback channel based on a resource overlap indicated in the sidelink control information, the resource overlap occurring between sidelink transmissions scheduled on a sidelink resource of the set of sidelink resources. The operations of 915 may be performed according to the methods described herein. In some examples, aspects of the operations of 915 may be performed by a feedback transmission component as described with reference to FIGS. 5 through 8.

FIG. 10 shows a flowchart illustrating a method 1000 that supports resource collision indication using feedback in accordance with one or more aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1005, the UE may receive sidelink control information from a second UE in a sidelink control channel, the sidelink control information indicating a set of sidelink resources reserved for transmission by the second UE. The operations of 1005 may be performed according to the methods described herein. In some examples, aspects of the operations of 1005 may be performed by a SCI decoding component as described with reference to FIGS. 5 through 8.

At 1010, the UE may receive, in the sidelink control information, a destination identifier for the sidelink transmissions indicating a recipient of the one or more transmissions. The operations of 1010 may be performed according to the methods described herein. In some examples, aspects of the operations of 1010 may be performed by a SCI decoding component as described with reference to FIGS. 5 through 8.

At 1015, the UE may compare the destination identifier for the sidelink transmissions to an identifier of the first UE. The operations of 1015 may be performed according to the methods described herein. In some examples, aspects of the operations of 1015 may be performed by a destination ID component as described with reference to FIGS. 5 through 8.

At 1020, the UE may determine that the first UE is an intended recipient of at least one of the sidelink transmissions. The operations of 1020 may be performed according to the methods described herein. In some examples, aspects of the operations of 1020 may be performed by a destination ID component as described with reference to FIGS. 5 through 8.

At 1025, the UE may transmit the negative acknowledgement message based on the category of UEs including intended recipients of at least one of the sidelink transmissions resulting in the resource overlap. The operations of 1025 may be performed according to the methods described herein. In some examples, aspects of the operations of 1025 may be performed by a feedback transmission component as described with reference to FIGS. 5 through 8.

At 1030, the UE may transmit a message on a sidelink feedback channel based on a resource overlap indicated in the sidelink control information, the resource overlap occurring between sidelink transmissions scheduled on a sidelink resource of the set of sidelink resources. The operations of 1030 may be performed according to the methods described herein. In some examples, aspects of the operations of 1030 may be performed by a feedback transmission component as described with reference to FIGS. 5 through 8.

At 1035, the UE may transmit the message indicative of the resource overlap on the sidelink feedback channel based on the first UE being of a category of UEs designated to provide an indication of the resource overlap. The operations of 1035 may be performed according to the methods described herein. In some examples, aspects of the operations of 1035 may be performed by a feedback transmission component as described with reference to FIGS. 5 through 8.

FIG. 11 shows a flowchart illustrating a method 1100 that supports resource collision indication using feedback in accordance with one or more aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1105, the UE may decode sidelink control information received from a second UE in a sidelink control channel, the sidelink control information indicating a set of sidelink resources reserved for transmission by the second UE. The operations of 1105 may be performed according to the methods described herein. In some examples, aspects of the operations of 1105 may be performed by a SCI decoding component as described with reference to FIGS. 5 through 8.

At 1110, the UE may transmit a feedback message on a sidelink feedback channel based on a resource overlap indicated in the sidelink control information, the resource overlap occurring between sidelink transmissions scheduled on a sidelink resource of the set of sidelink resources. The operations of 1110 may be performed according to the methods described herein. In some examples, aspects of the operations of 1110 may be performed by a feedback transmission component as described with reference to FIGS. 5 through 8.

At 1115, the UE may transmit the message indicative of the resource overlap on the sidelink feedback channel based on the first UE being of a category of UEs designated to provide an indication of the resource overlap. The operations of 1115 may be performed according to the methods described herein. In some examples, aspects of the operations of 1115 may be performed by a feedback transmission component as described with reference to FIGS. 5 through 8.

At 1120, the UE may transmit the negative acknowledgement message based on the category of UEs including UEs that are intended recipients of at least one of the sidelink transmissions resulting in the resource overlap and other UEs. The operations of 1120 may be performed according to the methods described herein. In some examples, aspects of the operations of 1120 may be performed by a feedback transmission component as described with reference to FIGS. 5 through 8.

Figure 12:
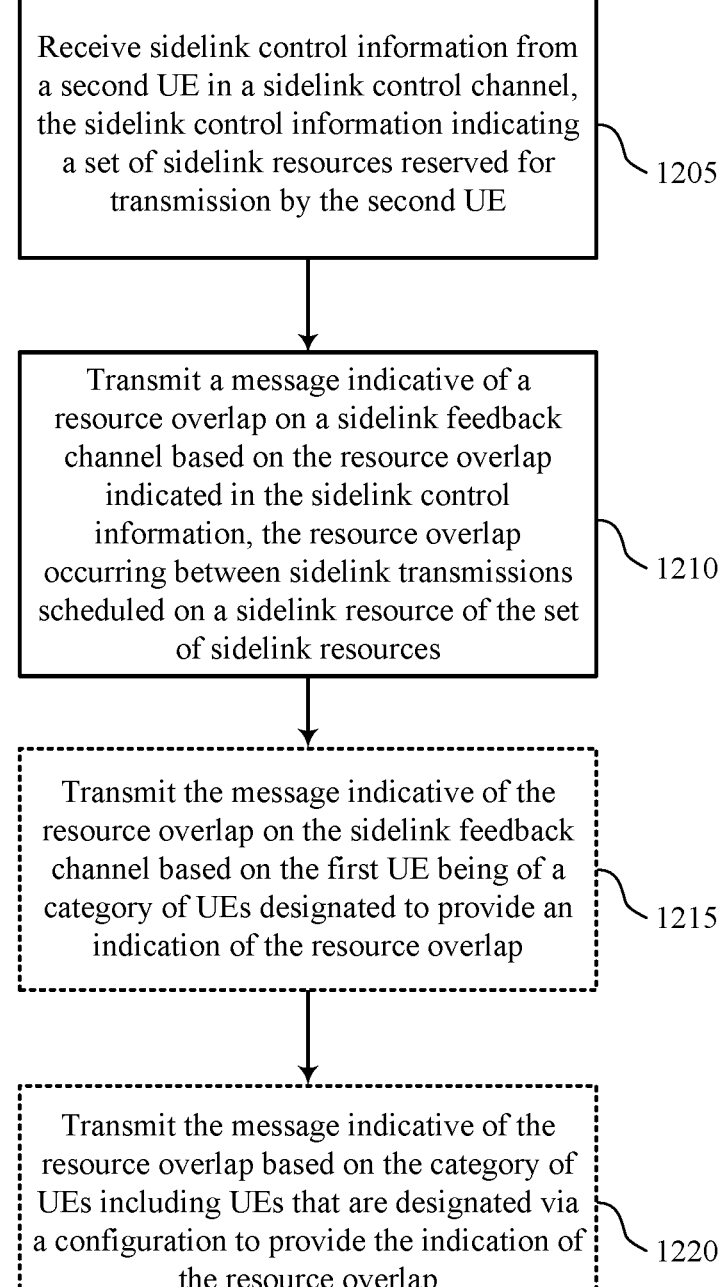

FIG. 12 shows a flowchart illustrating a method 1200 that supports resource collision indication using feedback in accordance with one or more aspects of the present disclosure. The operations of method 1200 may be implemented by a UE 115 or its components as described herein. For example, the operations of method 1200 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1205, the UE may receive sidelink control information from a second UE in a sidelink control channel, the sidelink control information indicating a set of sidelink resources reserved for transmission by the second UE. The operations of 1205 may be performed according to the methods described herein. In some examples, aspects of the operations of 1205 may be performed by a SCI decoding component as described with reference to FIGS. 5 through 8.

At 1210, the UE may transmit a message on a sidelink feedback channel based on a resource overlap indicated in the sidelink control information, the resource overlap occurring between sidelink transmissions scheduled on a sidelink resource of the set of sidelink resources. The operations of 1210 may be performed according to the methods described herein. In some examples, aspects of the operations of 1210 may be performed by a feedback transmission component as described with reference to FIGS. 5 through 8.

At 1215, the UE may transmit the message indicative of the resource overlap on the sidelink feedback channel based on the first UE being of a category of UEs designated to provide an indication of the resource overlap. The operations of 1215 may be performed according to the methods described herein. In some examples, aspects of the operations of 1215 may be performed by a feedback transmission component as described with reference to FIGS. 5 through 8.

At 1220, the UE may transmit the negative acknowledgement message based on the category of UEs including UEs that are designated via a configuration to provide the indication of the resource overlap. The operations of 1220 may be performed according to the methods described herein. In some examples, aspects of the operations of 1220 may be performed by a feedback transmission component as described with reference to FIGS. 5 through 8.

FIG. 13 shows a flowchart illustrating a method 1300 that supports resource collision indication using feedback in accordance with one or more aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may receive sidelink control information from a second UE in a sidelink control channel, the sidelink control information indicating a set of sidelink resources reserved for transmission by the second UE. The operations of 1305 may be performed according to the methods described herein. In some examples, aspects of the operations of 1305 may be performed by a SCI decoding component as described with reference to FIGS. 5 through 8.

At 1310, the UE may identify a priority associated with one or more transmissions of the sidelink transmissions. The operations of 1310 may be performed according to the methods described herein. In some examples, aspects of the operations of 1310 may be performed by a priority identification component as described with reference to FIGS. 5 through 8.

At 1315, the UE may compare the identified priority to a threshold priority. The operations of 1315 may be performed according to the methods described herein. In some examples, aspects of the operations of 1315 may be performed by a priority identification component as described with reference to FIGS. 5 through 8.

At 1320, the UE may transmit the message indicative of the resource overlap to one or more UEs on the sidelink feedback channel based on the identified priority satisfying the threshold priority. The operations of 1320 may be performed according to the methods described herein. In some examples, aspects of the operations of 1320 may be performed by a feedback transmission component as described with reference to FIGS. 5 through 8.

At 1325, the UE may transmit a message on a sidelink feedback channel based on a resource overlap indicated in the sidelink control information, the resource overlap occurring between sidelink transmissions scheduled on a sidelink resource of the set of sidelink resources. The operations of 1325 may be performed according to the methods described herein. In some examples, aspects of the operations of 1325 may be performed by a feedback transmission component as described with reference to FIGS. 5 through 8.

FIG. 14 shows a flowchart illustrating a method 1400 that supports resource collision indication using feedback in accordance with one or more aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may receive sidelink control information from a second UE in a sidelink control channel, the sidelink control information indicating a set of sidelink resources reserved for transmission by the second UE. The operations of 1405 may be performed according to the methods described herein. In some examples, aspects of the operations of 1405 may be performed by a SCI decoding component as described with reference to FIGS. 5 through 8.

At 1410, the UE may identify a signal power associated with one or more transmissions of the sidelink transmissions. The operations of 1410 may be performed according to the methods described herein. In some examples, aspects of the operations of 1410 may be performed by a signal power measurement component as described with reference to FIGS. 5 through 8.

At 1415, the UE may compare the identified signal power to a threshold signal power. The operations of 1415 may be performed according to the methods described herein. In some examples, aspects of the operations of 1415 may be performed by a signal power measurement component as described with reference to FIGS. 5 through 8.

At 1420, the UE may transmit the message indicative of the resource overlap to one or more UEs based on the identified signal power satisfying the threshold signal power. The operations of 1420 may be performed according to the methods described herein. In some examples, aspects of the operations of 1420 may be performed by a feedback transmission component as described with reference to FIGS. 5 through 8.

At 1425, the UE may transmit a message on a sidelink feedback channel based on a resource overlap indicated in the sidelink control information, the resource overlap occurring between sidelink transmissions scheduled on a sidelink resource of the set of sidelink resources. The operations of 1425 may be performed according to the methods described herein. In some examples, aspects of the operations of 1425 may be performed by a feedback transmission component as described with reference to FIGS. 5 through 8.

FIG. 15 shows a flowchart illustrating a method 1500 that supports resource collision indication using feedback in accordance with one or more aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE may receive sidelink control information from a second UE in a sidelink control channel, the sidelink control information indicating a set of sidelink resources reserved for transmission by the second UE. The operations of 1505 may be performed according to the methods described herein. In some examples, aspects of the operations of 1505 may be performed by a SCI decoding component as described with reference to FIGS. 5 through 8.

At 1510, the UE may determine a set of geographic locations for one or more UEs, the location of the one or more UEs being associated with a zone identifier. The operations of 1510 may be performed according to the methods described herein. In some examples, aspects of the operations of 1510 may be performed by a zone ID component as described with reference to FIGS. 5 through 8.

At 1515, the UE may transmit the message indicative of the resource overlap to the one or more UEs based on the zone identifier. The operations of 1515 may be performed according to the methods described herein. In some examples, aspects of the operations of 1515 may be performed by a feedback transmission component as described with reference to FIGS. 5 through 8.

At 1520, the UE may transmit a message on a sidelink feedback channel based on a resource overlap indicated in the sidelink control information, the resource overlap occurring between sidelink transmissions scheduled on a sidelink resource of the set of sidelink resources. The operations of 1520 may be performed according to the methods described herein. In some examples, aspects of the operations of 1520 may be performed by a feedback transmission component as described with reference to FIGS. 5 through 8.

FIG. 16 shows a flowchart illustrating a method 1600 that supports resource collision indication using feedback in accordance with one or more aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1605, the UE may receive sidelink control information from a second UE in a sidelink control channel, the sidelink control information indicating a set of sidelink resources reserved for transmission by the second UE. The operations of 1605 may be performed according to the methods described herein. In some examples, aspects of the operations of 1605 may be performed by a SCI decoding component as described with reference to FIGS. 5 through 8.

At 1610, the UE may identify a metric associated with system congestion of the sidelink control channel. The operations of 1610 may be performed according to the methods described herein. In some examples, aspects of the operations of 1610 may be performed by a system congestion measurement component as described with reference to FIGS. 5 through 8.

At 1615, the UE may compare the metric to a threshold system congestion. The operations of 1615 may be performed according to the methods described herein. In some examples, aspects of the operations of 1615 may be performed by a system congestion measurement component as described with reference to FIGS. 5 through 8.

At 1620, the UE may transmit the message indicative of the resource overlap to one or more UEs on the sidelink feedback channel based on the metric being less than a threshold system congestion. The operations of 1620 may be performed according to the methods described herein. In some examples, aspects of the operations of 1620 may be performed by a feedback transmission component as described with reference to FIGS. 5 through 8.

At 1625, the UE may transmit a message on a sidelink feedback channel based on a resource overlap indicated in the sidelink control information, the resource overlap occurring between sidelink transmissions scheduled on a sidelink resource of the set of sidelink resources. The operations of 1625 may be performed according to the methods described herein. In some examples, aspects of the operations of 1625 may be performed by a feedback transmission component as described with reference to FIGS. 5 through 8.

The following provides an overview of examples of the present disclosure:

Example 1: A method for wireless communications at a UE, comprising: receiving sidelink control information from a second UE in a sidelink control channel, the sidelink control information indicating a set of sidelink resources reserved for transmission by the second UE; and transmitting a message on a sidelink feedback channel based at least in part on a resource overlap indicated in the sidelink control information, the resource overlap occurring between sidelink transmissions scheduled on a sidelink resource of the set of sidelink resources.

Example 2: The method of example 1, wherein transmitting the message based at least in part on the resource overlap further comprises: transmitting a message indicative of the resource overlap on the sidelink feedback channel based at least in part on the first UE being of a category of UEs designated to provide an indication of the resource overlap.

Example 3: The method of example 2, further comprising: receiving, in the sidelink control information, a destination identifier for the sidelink transmissions indicating a recipient of the one or more transmissions; comparing the destination identifier for the sidelink transmissions to an identifier of the first UE; determining that the first UE is an intended recipient of at least one of the sidelink transmissions; and transmitting the message indicative of the resource overlap based at least in part on the category of UEs including intended recipients of at least one of the sidelink transmissions resulting in the resource overlap.

Example 4: The method of any one of examples 2 and 3 further comprising: transmitting the message indicative of the resource overlap based at least in part on the category of UEs including UEs that are intended recipients of at least one of the sidelink transmissions resulting in the resource overlap and other UEs.

Example 5: The method of any one of examples 2 through 4, further comprising: transmitting the message indicative of the resource overlap based at least in part on the category of UEs including UEs that are designated via a configuration to provide the indication of the resource overlap.

Example 6: The method of any of examples 1 through 5, further comprising: receiving a retransmission of at least one of the sidelink transmissions based at least in part on transmitting the message.

Example 7: The method of any one of examples 1 through 6, wherein transmitting the message based at least in part on the resource overlap further comprises: transmitting a message indicative of the resource overlap to all UEs providing the sidelink transmissions involved in the resource overlap.

Example 8: The method of any one of examples 1 through 7, wherein transmitting the message based at least in part on the resource overlap further comprises: identifying a priority associated with one or more transmissions of the sidelink transmissions; comparing the identified priority to a threshold priority; and transmitting a message indicative of the resource overlap to one or more UEs on the sidelink feedback channel based at least in part on the identified priority satisfying the threshold priority.

Example 9: The method of any of examples 1 through 8, wherein transmitting the message based at least in part on the resource overlap further comprises: identifying a signal power associated with one or more transmissions of the sidelink transmissions; comparing the identified signal power to a threshold signal power; and transmitting a message indicative of the resource overlap to one or more UEs based at least in part on the identified signal power satisfying the threshold signal power.

Example 10: The method of example 9, further comprising: determining the threshold signal power based at least in part on a RSRP measurement associated with the one or more transmissions of the sidelink transmissions.

Example 11: The method of any one of examples 1 through 10, wherein transmitting the message based at least in part on the resource overlap further comprises: determining a set of geographic locations for one or more UEs, the location of the one or more UEs being associated with a zone identifier; and transmitting a message indicative of the resource overlap to the one or more UEs based at least in part on the zone identifier.

Example 12: The method of any one of examples 1 through 11, wherein transmitting the message based at least in part on the resource overlap further comprises: identifying a metric associated with system congestion of the sidelink control channel; comparing the metric to a threshold system congestion; and transmitting a message indicative of the resource overlap to one or more UEs on the sidelink feedback channel based at least in part on the metric being less than a threshold system congestion.

Example 13: The method of example 12, the metric comprising a CR, a CBR, or both.

Example 14: The method of any one of examples 1 through 13, wherein transmitting the message based at least in part on the resource overlap further comprises: transmitting a message indicative of the resource overlap on the sidelink feedback channel based at least in part on a distance between the first UE and the second UE, a location of the first UE and the second UE, or both.

Example 15: The method of any one of examples 1 through 14, wherein transmitting the message based at least in part on the resource overlap further comprises: determining, based at least in part on the sidelink control information, that the resource overlap between the sidelink transmissions scheduled in the sidelink resource is to occur in the future; and transmitting a message indicative of the resource overlap on the sidelink feedback channel based at least in part on the determination.

Example 16: The method of any one of examples 1 through 15, the resource overlap comprising a time overlap, a frequency overlap, or both.

Example 17: The method of any one of examples 1 through 16, further comprising: determining the resource overlap based at least in part on interference cancellation.

Example 18: The method of example 1, wherein the message indicative of the resource overlap comprises message indicative of the resource overlap transmitted on a sidelink feedback channel.

Example 19: An apparatus for wireless communication comprising at least one means for performing a method of any one of examples 1 through 18.

Example 20: An apparatus for wireless communication comprising a processor and memory coupled to the processor, the processor and memory configured to perform a method of any one of examples 1 through 18.

Example 21: A non-transitory computer-readable medium storing code for wireless communication, the code comprising instructions executable by a processor to perform a method of any one of examples 1 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations described herein are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a first user equipment (UE), comprising:
   one or more processors, and
   one or more memories coupled with the one or more processors, the one or more processors and the one or more memories configured to:
      receive sidelink control information from a second UE via a sidelink control channel, the sidelink control information indicating a first sidelink resource reserved for a first sidelink transmission by the second UE; and
      transmit, via a sidelink feedback channel, a message indicative of a resource overlap between the first sidelink resource reserved for the first sidelink transmission and a second sidelink resource reserved for a second sidelink transmission, the message including a same base sequence used by the first UE for an acknowledgement message, wherein the message differs from the acknowledgement message based at least in part on application of different cyclic shifts.

2. The apparatus of claim 1, wherein to transmit the message indicative of the resource overlap, the one or more processors and the one or more memories are configured to:
   transmit the message indicative of the resource overlap on the sidelink feedback channel based at least in part on the first UE being of a category of UEs designated to provide an indication of the resource overlap.

3. The apparatus of claim 1, wherein to transmit the message indicative of the resource overlap, the one or more processors and the one or more memories are configured to:
   receive, in the sidelink control information, a destination identifier indicating a recipient of the first sidelink transmission and the second sidelink transmission;

compare the destination identifier to an identifier of the first UE;
determine that the first UE is an intended recipient of at least one of the first sidelink transmission or the second sidelink transmission; and
transmit the message indicative of the resource overlap based at least in part on a category of UEs including intended recipients of at least one of the first sidelink transmission or the second sidelink transmission resulting in the resource overlap.

4. The apparatus of claim 1, wherein to transmit the message indicative of the resource overlap, the one or more processors and the one or more memories are configured to:
   transmit the message indicative of the resource overlap based at least in part on a category of UEs including UEs that are intended recipients of at least one of the first sidelink transmission or the second sidelink transmission resulting in the resource overlap and other UEs.

5. The apparatus of claim 1, wherein to transmit the message indicative of the resource overlap, the one or more processors and the one or more memories are configured to:
   transmit the message indicative of the resource overlap based at least in part on the first UE being of a category of UEs including UEs that are designated via a configuration to provide the message indicative of the resource overlap.

6. The apparatus of claim 1, wherein the one or more processors and the one or more memories are further configured to:
   receive a retransmission of at least one of the first sidelink transmission or the second sidelink transmission based at least in part on transmitting the message indicative of the resource overlap.

7. The apparatus of claim 1, wherein to transmit the message indicative of the resource overlap, the one or more processors and the one or more memories are configured to:
   determine, based at least in part on the sidelink control information, that the resource overlap between the first sidelink resource and the second sidelink resource is to occur at a future time; and
   transmit the message indicative of the resource overlap based at least in part on the determination.

8. The apparatus of claim 1, wherein the resource overlap comprises a time overlap, a frequency overlap, or both.

9. The apparatus of claim 1, wherein to transmit the message indicative of the resource overlap, the one or more processors and the one or more memories are configured to:
   identify a metric associated with system congestion of the sidelink control channel;
   compare the metric to a threshold system congestion; and
   transmit the message indicative of the resource overlap to one or more UEs based at least in part on the metric being less than the threshold system congestion.

10. The apparatus of claim 9, wherein the metric comprises a channel occupation ratio (CR), a channel busy ratio (CBR), or both.

11. The apparatus of claim 1, wherein to transmit the message indicative of the resource overlap, the one or more processors and the one or more memories are configured to:
   transmit the message indicative of the resource overlap based at least in part on a distance between the first UE and the second UE, a location of the first UE and the second UE, or both.

12. The apparatus of claim 1, wherein to transmit the message indicative of the resource overlap, the one or more processors and the one or more memories are configured to:

transmit the message indicative of the resource overlap to all UEs providing sidelink transmissions involved in the resource overlap.

13. The apparatus of claim 1, wherein to transmit the message indicative of the resource overlap, the one or more processors and the one or more memories are configured to:

identify a priority associated with the first sidelink transmission, the second sidelink transmission, or both;

compare the identified priority to a threshold priority; and transmit the message indicative of the resource overlap to one or more UEs based at least in part on the identified priority satisfying the threshold priority.

14. The apparatus of claim 1, wherein, to transmit the message indicative of the resource overlap, the one or more processors and the one or more memories are configured to:

identify a signal power associated with the first sidelink transmission, the second sidelink transmission, or both;

compare the identified signal power to a threshold signal power; and transmit the message indicative of the resource overlap to one or more UEs based at least in part on the identified signal power satisfying the threshold signal power.

15. The apparatus of claim 14, wherein the one or more processors and the one or more memories are further configured to:

determine the threshold signal power based at least in part on a reference signal received power (RSRP) measurement associated with the first sidelink transmission, the second sidelink transmission, or both.

16. The apparatus of claim 1, wherein, to transmit the message indicative of the resource overlap, the one or more processors and the one or more memories are configured to:

determine a set of geographic locations for one or more UEs, a location of the one or more UEs being associated with a zone identifier; and transmit the message indicative of the resource overlap to the one or more UEs based at least in part on the zone identifier.

17. The apparatus of claim 1, wherein the one or more processors and the one or more memories are further configured to:

determine the resource overlap based at least in part on interference cancellation.

18. The apparatus of claim 1, wherein the message indicative of the resource overlap comprises a negative acknowledgement message transmitted on a sidelink feedback channel.

19. A method for wireless communications at a first user equipment (UE), comprising:

receiving sidelink control information from a second UE via a sidelink control channel, the sidelink control information indicating a first sidelink resource reserved for a first sidelink transmission by the second UE; and transmitting, via a sidelink feedback channel, a message indicative of a resource overlap between the first sidelink resource reserved for the first sidelink transmission and a second sidelink resource reserved for a second sidelink transmission, the message including a same base sequence used by the first UE for an acknowledgement message, wherein the message differs from the acknowledgement message based at least in part on application of different cyclic shifts.

20. The method of claim 19, wherein transmitting the message indicative of the resource overlap comprises:

transmitting the message indicative of the resource overlap on the sidelink feedback channel based at least in part on the first UE being of a category of UEs designated to provide an indication of the resource overlap.

21. The method of claim 20, wherein transmitting the message indicative of the resource overlap further comprises:

receiving, in the sidelink control information, a destination identifier indicating a recipient of the first sidelink transmission and the second sidelink transmission;

comparing the destination identifier to an identifier of the first UE;

determining that the first UE is an intended recipient of at least one of the first sidelink transmission or the second sidelink transmission; and transmitting the message indicative of the resource overlap based at least in part on a category of UEs including intended recipients of at least one of the first sidelink transmission or the second sidelink transmission resulting in the resource overlap.

22. The method of claim 20, wherein transmitting the message indicative of the resource overlap further comprises:

transmitting the message indicative of the resource overlap based at least in part on a category of UEs including UEs that are intended recipients of at least one of the first sidelink transmission or the second sidelink transmission resulting in the resource overlap and other UEs.

23. The method of claim 20, wherein transmitting the message indicative of the resource overlap further comprises:

transmitting the message indicative of the resource overlap based at least in part on the category of UEs including UEs that are designated via a configuration to provide the message indicative of the resource overlap.

24. The method of claim 19, further comprising:

receiving a retransmission of at least one of the first sidelink transmission or the second sidelink transmission based at least in part on transmitting the message indicative of the resource overlap.

25. The method of claim 19, wherein the resource overlap comprises a time overlap, a frequency overlap, or both.

26. The method of claim 19, wherein transmitting the message indicative of the resource overlap comprises:

identifying a metric associated with system congestion of the sidelink control channel;

comparing the metric to a threshold system congestion; and transmitting the message indicative of the resource overlap to one or more UEs based at least in part on the metric being less than the threshold system congestion.

27. The method of claim 26, the metric comprising a channel occupation ratio (CR), a channel busy ratio (CBR), or both.

28. The method of claim 19, wherein the message indicative of the resource overlap comprises a negative acknowledgement message transmitted on a sidelink feedback channel.

29. An apparatus for wireless communications at a first user equipment (UE), comprising:

means for receiving sidelink control information from a second UE via a sidelink control channel, the sidelink control information indicating a first sidelink resource reserved for a first sidelink transmission by the second UE; and means for transmitting, via a sidelink feedback channel, a message indicative of a resource overlap between the first sidelink resource reserved for the first sidelink transmission and a second sidelink resource reserved for a second sidelink transmission, the message including a same base sequence used by the first UE for an acknowledgement message, wherein the message differs from the acknowledgement message based at least in part on application of different cyclic shifts.

30. A non-transitory computer-readable medium storing code for wireless communications at a first user equipment (UE), the code comprising instructions executable by one or more processors to:

receive sidelink control information from a second UE via a sidelink control channel, the sidelink control information indicating a first sidelink resource reserved for a first sidelink transmission by the second UE; and transmit, via a sidelink feedback channel, a message indicative of a resource overlap between the first sidelink resource reserved for the first sidelink transmission and a second sidelink resource reserved for a second sidelink transmission, the message including a same base sequence used by the first UE for an acknowledgement message, wherein the message differs from the acknowledgement message based at least in part on application of different cyclic shifts.

*   *   *   *   *